(12) United States Patent
Dai et al.

(10) Patent No.: US 8,934,360 B2
(45) Date of Patent: Jan. 13, 2015

(54) METHOD, TERMINAL AND NETWORK SYSTEM FOR REPORTING BUFFER STATUS REPORT

(75) Inventors: Qian Dai, Shenzhen (CN); Yincheng Zhang, Shenzhen (CN); Tao Wang, Shenzhen (CN); Guanzhou Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 475 days.

(21) Appl. No.: 13/258,975

(22) PCT Filed: Jun. 4, 2010

(86) PCT No.: PCT/CN2010/073573
§ 371 (c)(1),
(2), (4) Date: Sep. 22, 2011

(87) PCT Pub. No.: WO2010/145463
PCT Pub. Date: Dec. 23, 2010

(65) Prior Publication Data
US 2012/0099452 A1    Apr. 26, 2012

(30) Foreign Application Priority Data
Jun. 19, 2009   (CN) .......................... 2009 1 0150610

(51) Int. Cl.
*H04W 24/10*    (2009.01)
*H04W 72/12*    (2009.01)

(52) U.S. Cl.
CPC ...... *H04W 72/1284* (2013.01); *H04W 72/1221* (2013.01)
USPC ........................................................ 370/252

(58) Field of Classification Search
CPC ..... H04W 24/00; H04W 72/04; H04W 88/08; H04W 76/00; H04W 84/08; H04W 76/02; H04W 28/04; H04W 5/0007; H04W 48/08; H04W 74/08; H04L 47/10; H04L 47/15; H04L 47/70; H04L 47/35; H04L 47/30
USPC .............. 370/230, 235, 252, 329, 341, 395.4, 370/431, 462, 485
See application file for complete search history.

(56) References Cited

U.S. PATENT DOCUMENTS

2006/0251079 A1* 11/2006 Kwak et al. ................... 370/394
2008/0004058 A1   1/2008 Jeong et al.
(Continued)

FOREIGN PATENT DOCUMENTS

| CN | 1917694 A | 2/2007 |
| CN | 101330314 A | 12/2008 |

(Continued)

OTHER PUBLICATIONS

International Search Report in international application No. PCT/CN2010/073573, mailed on Sep. 16, 2010.
English Translation of the Written Opinion of the International Search Authority in international application No. PCT/CN2010/073573, mailed on Sep. 16, 2010.
BSR for Persistent Scheduling Apr. 4, 2008.
(Continued)

*Primary Examiner* — Kwang B Yao
*Assistant Examiner* — Syed M Bokhari
(74) *Attorney, Agent, or Firm* — Oppedahl Patent Law Firm LLC

(57) ABSTRACT

The present invention discloses a method, a terminal and a network system for reporting a buffer status report. The method comprises: a terminal triggers a buffer status report (BSR) and obtains radio resource information of uplink component carriers in a radio network; one or more BSR data units are constructed based on information of buffer data volume to be transmitted; one or more uplink component carriers are selected from the uplink component carriers with available radio resources, and the BSR data unit(s) is/are transmitted on the selected uplink component carrier(s) to a network side. The present invention fully takes advantages of wide bandwidth of a long term evolution-advanced (LTE)-A system, and can realize high-efficiency-and-quality transmission of BSR data unit(s).

27 Claims, 13 Drawing Sheets

(56) References Cited

U.S. PATENT DOCUMENTS

| | | | |
|---|---|---|---|
| 2010/0077100 A1* | 3/2010 | Hsu et al. | 709/234 |
| 2010/0189007 A1* | 7/2010 | Chun et al. | 370/252 |
| 2010/0272046 A1* | 10/2010 | Guo | 370/329 |
| 2010/0296470 A1* | 11/2010 | Heo et al. | 370/329 |
| 2012/0275418 A1 | 11/2012 | Jeong et al. | |
| 2013/0308574 A1 | 11/2013 | Jeong et al. | |

FOREIGN PATENT DOCUMENTS

| | | |
|---|---|---|
| CN | 101369956 A | 2/2009 |
| EP | 1871057 A1 | 12/2007 |
| JP | 2012522473 A | 9/2012 |
| KR | 10-2007-0121576 A | 12/2007 |

OTHER PUBLICATIONS

Supplementary European Search Report in European application No. 10788859.6, mailed on Feb. 19, 2014. (7 pages—see entire document).

Boldi et al, Preliminary Winner+System Concept, May 22, 2009 [p. 11] [p. 13] [p. 40-p. 42].

Ericsson, Impact of Carrier Aggregation on the L2 protocol architecture for LTE Rel-10, 3GPP TSG-RAN WG2 Meeting #66 R2-092957, Mar. 8, 2009.

Philips, Buffer Status Size Field, 3GPP TSG-RAN2 Meeting #62bis R2-083244, Jul. 4, 2008, p. 1-p. 2, URL, http://www.3gpp.org/ftp/tsg_ran/WG2_RL2/TSGR2_62bis/Docs/R2-083244.zip.

* cited by examiner

Fig. 9

| Level | Actual data volume (BS) [bytes] | Level | Actual data volume (BS) [bytes] | Level | Actual data volume (BS) [bytes] | Level | Actual data volume (BS) [bytes] |
|---|---|---|---|---|---|---|---|
| 0 | BS = 0 | 21 | 200 < BS <= 234 | 42 | 5476 < BS <= 6411 | 63 | 150000 < BS <= 175500 |
| 1 | 0 < BS <= 10 | 22 | 234 < BS <= 274 | 43 | 6411 < BS <= 7505 | 64 | 175500 < BS <= 205335 |
| 2 | 10 < BS <= 12 | 23 | 274 < BS <= 321 | 44 | 7505 < BS <= 8787 | 65 | 205335 < BS <= 240241 |
| 3 | 12 < BS <= 14 | 24 | 321 < BS <= 376 | 45 | 8787 < BS <= 10287 | 66 | 240241 < BS <= 281083 |
| 4 | 14 < BS <= 17 | 25 | 376 < BS <= 440 | 46 | 10287 < BS <= 12043 | 67 | 281083 < BS <= 328867 |
| 5 | 17 < BS <= 19 | 26 | 440 < BS <= 515 | 47 | 12043 < BS <= 14099 | 68 | 328867 < BS <= 384774 |
| 6 | 19 < BS <= 22 | 27 | 515 < BS <= 603 | 48 | 14099 < BS <= 16507 | 69 | 384774 < BS <= 450186 |
| 7 | 22 < BS <= 26 | 28 | 603 < BS <= 706 | 49 | 16507 < BS <= 19325 | 70 | 450186 < BS <= 526717 |
| 8 | 26 < BS <= 31 | 29 | 706 < BS <= 826 | 50 | 19325 < BS <= 22624 | 71 | 526717 < BS <= 616259 |
| 9 | 31 < BS <= 36 | 30 | 826 < BS <= 967 | 51 | 22624 < BS <= 26487 | 72 | 616259 < BS <= 721024 |
| 10 | 36 < BS <= 42 | 31 | 967 < BS <= 1132 | 52 | 26487 < BS <= 31009 | 73 | 721024 < BS <= 843598 |
| 11 | 42 < BS <= 49 | 32 | 1132 < BS <= 1326 | 53 | 31009 < BS <= 36304 | 74 | 843598 < BS <= 987009 |
| 12 | 49 < BS <= 57 | 33 | 1326 < BS <= 1552 | 54 | 36304 < BS <= 42502 | 75 | 987009 < BS <= 1154801 |
| 13 | 57 < BS <= 67 | 34 | 1552 < BS <= 1817 | 55 | 42502 < BS <= 49759 | 76 | 1154801 < BS <= 1351117 |
| 14 | 67 < BS <= 78 | 35 | 1817 < BS <= 2127 | 56 | 49759 < BS <= 58255 | 77 | 1351117 < BS <= 1500000 |
| 15 | 78 < BS <= 91 | 36 | 2127 < BS <= 2490 | 57 | 58255 < BS <= 68201 | 78 | 1500000 < BS |
| 16 | 91 < BS <= 107 | 37 | 2490 < BS <= 2915 | 58 | 68201 < BS <= 79846 | | |
| 17 | 107 < BS <= 125 | 38 | 2915 < BS <= 3413 | 59 | 79846 < BS <= 93479 | | |
| 18 | 125 < BS <= 146 | 39 | 3413 < BS <= 3995 | 60 | 93479 < BS <= 109439 | | |
| 19 | 146 < BS <= 171 | 40 | 3995 < BS <= 4677 | 61 | 109439 < BS <= 128125 | | |
| 20 | 171 < BS <= 200 | 41 | 4677 < BS <= 5476 | 62 | 128125 < BS <= 150000 | | |

Fig. 10A

| Level | Actual data volume (BS) [bytes] | Level | Actual data volume (BS) [bytes] | Level | Actual data volume (BS) [bytes] | Level | Actual data volume (BS) [bytes] |
|---|---|---|---|---|---|---|---|
| 0 | BS = 0 | 32 | 1132 < BS <= 1326 | 64 | 170000 < BS <= 190000 | 96 | 810000 < BS <= 830000 |
| 1 | 0 < BS <= 10 | 33 | 1326 < BS <= 1552 | 65 | 190000 < BS <= 210000 | 97 | 830000 < BS <= 850000 |
| 2 | 10 < BS <= 12 | 34 | 1552 < BS <= 1817 | 66 | 210000 < BS <= 230000 | 98 | 850000 < BS <= 870000 |
| 3 | 12 < BS <= 14 | 35 | 1817 < BS <= 2127 | 67 | 230000 < BS <= 250000 | 99 | 870000 < BS <= 890000 |
| 4 | 14 < BS <= 17 | 36 | 2127 < BS <= 2490 | 68 | 250000 < BS <= 270000 | 100 | 890000 < BS <= 910000 |
| 5 | 17 < BS <= 19 | 37 | 2490 < BS <= 2915 | 69 | 270000 < BS <= 290000 | 101 | 910000 < BS <= 930000 |
| 6 | 19 < BS <= 22 | 38 | 2915 < BS <= 3413 | 70 | 290000 < BS <= 310000 | 102 | 930000 < BS <= 950000 |
| 7 | 22 < BS <= 26 | 39 | 3413 < BS <= 3995 | 71 | 310000 < BS <= 330000 | 103 | 950000 < BS <= 970000 |
| 8 | 26 < BS <= 31 | 40 | 3995 < BS <= 4677 | 72 | 330000 < BS <= 350000 | 104 | 970000 < BS <= 990000 |
| 9 | 31 < BS <= 36 | 41 | 4677 < BS <= 5476 | 73 | 350000 < BS <= 370000 | 105 | 990000 < BS <= 1010000 |
| 10 | 36 < BS <= 42 | 42 | 5476 < BS <= 6411 | 74 | 370000 < BS <= 390000 | 106 | 1010000 < BS <= 1030000 |
| 11 | 42 < BS <= 49 | 43 | 6411 < BS <= 7505 | 75 | 390000 < BS <= 410000 | 107 | 1030000 < BS <= 1050000 |
| 12 | 49 < BS <= 57 | 44 | 7505 < BS <= 8787 | 76 | 410000 < BS <= 430000 | 108 | 1050000 < BS <= 1070000 |
| 13 | 57 < BS <= 67 | 45 | 8787 < BS <= 10287 | 77 | 430000 < BS <= 450000 | 109 | 1070000 < BS <= 1090000 |
| 14 | 67 < BS <= 78 | 46 | 10287 < BS <= 12043 | 78 | 450000 < BS <= 470000 | 110 | 1090000 < BS <= 1110000 |
| 15 | 78 < BS <= 91 | 47 | 12043 < BS <= 14099 | 79 | 470000 < BS <= 490000 | 111 | 1110000 < BS <= 1130000 |
| 16 | 91 < BS <= 107 | 48 | 14099 < BS <= 16507 | 80 | 490000 < BS <= 510000 | 112 | 1130000 < BS <= 1150000 |
| 17 | 107 < BS <= 125 | 49 | 16507 < BS <= 19325 | 81 | 510000 < BS <= 530000 | 113 | 1150000 < BS <= 1170000 |
| 18 | 125 < BS <= 146 | 50 | 19325 < BS <= 22624 | 82 | 530000 < BS <= 550000 | 114 | 1170000 < BS <= 1190000 |
| 19 | 146 < BS <= 171 | 51 | 22624 < BS <= 26487 | 83 | 550000 < BS <= 570000 | 115 | 1190000 < BS <= 1210000 |
| 20 | 171 < BS <= 200 | 52 | 26487 < BS <= 31009 | 84 | 570000 < BS <= 590000 | 116 | 1210000 < BS <= 1230000 |
| 21 | 200 < BS <= 234 | 53 | 31009 < BS <= 36304 | 85 | 590000 < BS <= 610000 | 117 | 1230000 < BS <= 1250000 |
| 22 | 234 < BS <= 274 | 54 | 36304 < BS <= 42502 | 86 | 610000 < BS <= 630000 | 118 | 1250000 < BS <= 1270000 |
| 23 | 274 < BS <= 321 | 55 | 42502 < BS <= 49759 | 87 | 630000 < BS <= 650000 | 119 | 1270000 < BS <= 1290000 |
| 24 | 321 < BS <= 376 | 56 | 49759 < BS <= 58255 | 88 | 650000 < BS <= 670000 | 120 | 1290000 < BS <= 1310000 |
| 25 | 376 < BS <= 440 | 57 | 58255 < BS <= 68201 | 89 | 670000 < BS <= 690000 | 121 | 1310000 < BS <= 1330000 |
| 26 | 440 < BS <= 515 | 58 | 68201 < BS <= 79846 | 90 | 690000 < BS <= 710000 | 122 | 1330000 < BS <= 1350000 |

Fig. 10B

| 27 | 515 < BS <= 603 | 59 | 79846 < BS <= 93479 | 91 | 710000< BS <= 730000 | 123 | 1350000< BS <= 1370000 |
|---|---|---|---|---|---|---|---|
| 28 | 603 < BS <= 706 | 60 | 93479 < BS <= 109439 | 92 | 730000< BS <= 750000 | 124 | 1370000< BS <= 1390000 |
| 29 | 706 < BS <= 826 | 61 | 109439 < BS <= 128125 | 93 | 750000< BS <= 770000 | 125 | 1390000< BS <= 1410000 |
| 30 | 826 < BS <= 967 | 62 | 128125 < BS <= 150000 | 94 | 770000< BS <= 790000 | 126 | 1410000< BS <= 1430000 |
| 31 | 967 < BS <= 1132 | 63 | 150000< BS <= 170000 | 95 | 790000< BS <= 810000 | 127 | 1430000< BS <= 1450000 |
|  |  |  |  |  |  | 128 | 1450000< BS <= 1470000 |
|  |  |  |  |  |  | 129 | 1470000< BS <= 1490000 |
|  |  |  |  |  |  | 130 | 1490000< BS <= 1500000 |

Fig. 11

| Level | Actual data volume (BS) [bytes] | Level | Actual data volume (BS) [bytes] | Level | Actual data volume (BS) | Level | Actual data volume (BS) [bytes] |
|---|---|---|---|---|---|---|---|
| 0 | BS = 0 | 19 | 146 < BS <= 171 | 38 | 2915 < BS <= 3413 | 57 | 58255 < BS <= 68201 |
| 1 | 0 < BS <= 10 | 20 | 171 < BS <= 200 | 39 | 3413 < BS <= 3995 | 58 | 68201 < BS <= 79846 |
| 2 | 10 < BS <= 12 | 21 | 200 < BS <= 234 | 40 | 3995 < BS <= 4677 | 59 | 79846 < BS <= 93479 |
| 3 | 12 < BS <= 14 | 22 | 234 < BS <= 274 | 41 | 4677 < BS <= 5476 | 60 | 93479 < BS <= 109439 |
| 4 | 14 < BS <= 17 | 23 | 274 < BS <= 321 | 42 | 5476 < BS <= 6411 | 61 | 109439 < BS <= 128125 |
| 5 | 17 < BS <= 19 | 24 | 321 < BS <= 376 | 43 | 6411 < BS <= 7505 | 62 | 128125 < BS <= 150000 |
| 6 | 19 < BS <= 22 | 25 | 376 < BS <= 440 | 44 | 7505 < BS <= 8787 | 63 | BS > 150000 |
| 7 | 22 < BS <= 26 | 26 | 440 < BS <= 515 | 45 | 8787 < BS <= 10287 | | |
| 8 | 26 < BS <= 31 | 27 | 515 < BS <= 603 | 46 | 10287 < BS <= 12043 | | |
| 9 | 31 < BS <= 36 | 28 | 603 < BS <= 706 | 47 | 12043 < BS <= 14099 | | |
| 10 | 36 < BS <= 42 | 29 | 706 < BS <= 826 | 48 | 14099 < BS <= 16507 | | |
| 11 | 42 < BS <= 49 | 30 | 826 < BS <= 967 | 49 | 16507 < BS <= 19325 | | |
| 12 | 49 < BS <= 57 | 31 | 967 < BS <= 1132 | 50 | 19325 < BS <= 22625 | | |
| 13 | 57 < BS <= 67 | 32 | 1132 < BS <= 1326 | 51 | 22625 < BS <= 26487 | | |
| 14 | 67 < BS <= 78 | 33 | 1326 < BS <= 1552 | 52 | 26487 < BS <= 31009 | | |
| 15 | 78 < BS <= 91 | 34 | 1552 < BS <= 1817 | 53 | 31009 < BS <= 36305 | | |
| 16 | 91 < BS <= 107 | 35 | 1817 < BS <= 2127 | 54 | 36305 < BS <= 42504 | | |
| 17 | 107 < BS <= 125 | 36 | 2127 < BS <= 2490 | 55 | 42504 < BS <= 49759 | | |
| 18 | 125 < BS <= 146 | 37 | 2490 < BS <= 2915 | 56 | 49759 < BS <= 58255 | | |

Fig. 18

| LCG0 BS | |
|---|---|
| LCG0 BS | LCG1 BS |
| LCG1 BS | LCG2 BS |
| LCG2 BS | LCG3 BS |
| LCG3 BS | reserved bit |

BSR data units of the
first component carrier

| LCG0 BS | |
|---|---|
| LCG0 BS | LCG1 BS |
| LCG1 BS | LCG2 BS |
| LCG2 BS | LCG3 BS |
| LCG3 BS | reserved bit |

BSR data units of the
second component carrier

| LCG0 BS | |
|---|---|
| LCG0 BS | LCG1 BS |
| LCG1 BS | LCG2 BS |
| LCG2 BS | LCG3 BS |
| LCG3 BS | reserved bit |

BSR data units of the
third component carrier

Fig. 19

| serial number of LCG0 | LCG0 BS |
|---|---|
| LCG0 BS | reserved bit |

BSR data units of the
first component carrier

| serial number of LCG1 | LCG1 BS |
|---|---|
| LCG1 BS | reserved bit |

BSR data units of the
second component carrier

| serial number of LCG3 | LCG3 BS |
|---|---|
| LCG3 BS | reserved bit |

BSR data units of the
third component carrier

Fig. 20

| LCG0 BS | |
|---|---|
| LCG0 BS | LCG1 BS |
| LCG1 BS | LCG2 BS |
| LCG2 BS | LCG3 BS |
| LCG3 BS | reserved bit |

BSR data units of the
first component carrier

| LCG bit bitmap= "1100" | LCG0 BS | |
|---|---|---|
| LCG0 BS | | LCG1 BS |
| LCG1 BS | | |

BSR data units of the
second component carrier

| serial number of LCG3 | LCG3 BS |
|---|---|
| LCG3 BS | reserved bit |

BSR data units of the
third component carrier

US 8,934,360 B2

METHOD, TERMINAL AND NETWORK SYSTEM FOR REPORTING BUFFER STATUS REPORT

TECHNICAL FIELD

This invention relates to the technical field of wireless communications, particularly to a method, terminal and network system for reporting a buffer status report.

BACKGROUND

In an Evolved Universal Terrestrial Radio Access Network (E-UTRAN) of a third-generation mobile communication Long Term Evolution (LTE) system, uplink data is transmitted through a Physical Uplink Shared Channel (PUSCH). Uplink radio resources are allocated to each User Equipment (UE) by an Evolved NodeB (eNB). An access technology adopted by the E-UTRAN system is an Orthogonal Frequency Division Multiplexing (OFDM) technology. Compared with a second-generation mobile communication system, the radio resource management of the E-UTRAN system is featured with a wide bandwidth and multiple time courses, and the radio resources are two-dimensional time-frequency resources, thus greatly increasing the number of users carried therein.

A Radio Resource Control (RRC) layer of the LTE system may send an RRC message to realize many operations including establishing an RRC layer link between a UE and an eNB, configuring system parameters and transmitting UE capability parameters etc. A downlink RRC message is sent on a Physical Downlink Shared Channel (PDSCH). Some system-related common parameters, such as a cell frequency point and a cell system bandwidth and other information, are sent by the eNB to UEs in all cells through a broadcast message which is sent on a Physical Broadcast Channel (PBCH).

In order to allocate resources and provide services for every UE according to the demand thereof to realize a better multiplexing performance in uplink transmission, and fully, flexibly and efficiently utilizing the system bandwidth, the LTE system designs a special control message for allocating uplink transmission resources for a user. A special control message for allocating resources for the PUSCH is sent by the eNB to the UE; the resource allocation control message is also called UpLink Grant (UL Grant) which is sent on a Physical Downlink Control Channel (PDCCH).

In order to reasonably allocate radio resources for every UE, the LTE system requires the UEs to report the status of data volumes stored in their respective buffers and the report is reported to the eNB in the form of a Buffer Status Report (BSR). In the LTE system, Logical Channels (LCH) of a UE are divided into 4 Logical Channel Groups (LCG). The BSR reports the group number of every LCG and information of data volumes to be transmitted of all LCHs in the group. The BSR is carried by a PUSCH.

In the LTE system, a time interval for data transmission on a radio link is called a Transmission Time Interval (TTI).

Since the BSR is important reference information according to which the eNB performs reasonable radio resource scheduling for a UE, the LTE system stipulates many BSR types and sending rules. According to the varieties of events triggering the BSR, the BSR has three types, namely a Regular BSR, a Periodic BSR and a Padding BSR.

Trigger conditions of the Regular BSR include:

arrival of upper layer data that can be transmitted of a logical channel with a high priority which is higher than the priority of LCH data currently stored in a UE buffer;

change of a service cell; and timeout of a BSR retransmission timer (RETX_BSR_TIMER), and the existence of data that can be transmitted in a UE buffer.

A trigger condition of the Periodic BSR is timeout of a Periodic BSR Timer.

A Trigger condition of the Padding BSR is that there is neither a Regular BSR nor a Periodic BSR to be sent and that the number of bits used for padding in allocated uplink PUSCH resources is greater than or equal to the sum of the size of a BSR MAC CE and the size of an MAC sub-header of the BSR MAC CE.

The Padding BSR is a filled-type BSR, which is a supplement to the Regular BSR and the Periodic BSR. Correspondingly, the Regular BSR and the Periodic BSR are non-filled type BSRs. When the uplink does not send a Regular BSR or a Periodic BSR, the padding BSR can more effectively enable the eNB to acquire an LCG data change in the UE buffer in time.

The carrying modes of the Regular BSR, the Periodic BSR and the Padding BSR are different, the Regular BSR and the Periodic BSR are respectively encapsulated as an MAC Control Element (CE) in a Media Access Control Protocol Data Unit (MAC PDU). The Padding BSR is carried in the padding bits of the MAC PDU and also encapsulated as an MAC CE. The only difference in the carrying modes of these three BSRs is the use of the padding bits. The MAC PDU is sent on a PUSCH.

According to the definition of the current protocol standard (3Gpp TS36.321) of an LTE MAC layer, the structure of the aforementioned MAC PDU is as shown in FIG. 1. One MAC PDU comprises an MAC header, 0, 1 or more MAC CEs, 0, 1 or more MAC Service Data Units (SDU) and an optional padding bit (Padding). The MAC header comprises multiple MAC sub-headers, each of which is corresponding to the MAC CE, the MAC SDU or the Padding arranged after the MAC header in order. The MAC sub-headers include information such as the length or format of the corresponding MAC CE, the MAC SDU or the Padding. One MAC SDU at most includes one BSR MAC CE.

According to the format applied when a BSR is sent, the BSR has three types, namely a short BSR, a truncated BSR and a long BSR. According to the definition of the protocol standard of the LTE MAC layer, as shown in FIG. 2 and FIG. 3, the BSR format as shown in FIG. 2 is called a short BSR or a truncated BSR and the BSR format as shown in FIG. 3 is called a long BSR format. When a BSR triggered by a UE is a Regular BSR or a Periodic BSR and there is data to be transmitted in only one LCG of the UE in a TTI to send the BSR, the UE adopts a short BSR format to send the BSR. When a BSR triggered by a UE is a Regular BSR or a Periodic BSR and there is data to be transmitted in multiple LCGs of the UE in the TTI to send the BSR, the UE adopts a long BSR format to send the BSR. When a BSR triggered by a UE is a Padding BSR and there is data to be transmitted in multiple LCGs of the UE in the TTI to send the BSR, and the length of padding bits of the MAC PDU is insufficient to send a long BSR and a corresponding MAC sub-header, the UE adopts a truncated BSR format to report the BSR. When a BSR triggered by a UE is a Padding BSR, and there is data to be transmitted in multiple LCGs of the UE in the TTI to send the BSR, the UE reports the BSR by adopting a short BSR format. It should be noted that although the short BSR and the truncated BSR apply the format as shown in FIG. 2, they represent different meanings.

After a Regular BSR is triggered by a UE, since the events triggering the BSR are important events, the UE needs to trigger a scheduling request (SR) if there are no PUSCH resources for the UE in the present TTI to send the BSR. When there are available PUSCH resources for the UE in a subsequent TTI to send the BSR, the SR will be cancelled. When there are no available PUSCH resources for the UE in a subsequent TTI to send the BSR, the SR will be sent to the eNB on PUCCH resources to require the eNB to allocate PUSCH resources for the UE.

According to the definition of the current protocol standard (3Gpp TS36.321) of the LTE MAC layer, the basic flow of triggering and sending a BSR is as follows:

in each TTI, the UE determines whether to trigger a BSR according to the aforementioned BSR trigger conditions;

in each TTI, the UE determines whether there is a triggered BSR; if yes, the UE further determines whether there are available PUSCH resources in the current TTI and if there are available PUSCH resources in the current TTI, an appropriate BSR format is selected and encapsulated as an MAC CE; if there is no triggered BSR, the UE further determines whether to trigger a Padding BSR, if yes, an appropriate BSR format is selected and encapsulated as an MAC CE. After an MAC PDU is packaged, uplink transmission is performed.

The definitions of the aforementioned BSR formats and sending rules are defined in the current LTE release 8 standard. In order to adapt to the rapid increase in the demands of radio services at present and in the future, the next evolved LTE release 8 standard, namely an LTE-Advanced standard, is being formulated.

The LTE-Advanced is a standard put forward by the 3$^{rd}$ Generation Partner Project (3GPP) to meet the requirements of the International Mobile Telecommunication-Advanced (IMT-Advanced) of the International Telecommunication Union (ITU). An LTE-Advanced system is an evolved edition based on an LTE release 8 system. The LTE-Advanced system introduces many new technologies to meet the basic demands of the IMT-Advanced and the most important one is carrier aggregation.

Because of the shortage of radio frequency spectrum resources, the radio frequency spectrum resources owned by mobile operators all over the world are relatively scattered and the IMT-Advanced requires a higher peak rate (supporting 100 Mbps at high mobility and supporting 1 Gbps at low mobility). The maximum bandwidth of 20 MHz in the current LTE standard cannot meet the requirement of the IMT-Advanced, thus it is necessary to extend the bandwidth to a wider one, such as 40 MHz, 60 MHz or even wider. One of the methods to increase the bandwidth and the peak rate is to extend a frequency domain, that is, several frequency bands are bound to extend the bandwidth by means of carrier aggregation, which is the essence of the carrier aggregation technology.

In the LTE-Advanced system applying the carrier aggregation technology, the carrier participating in aggregation is called a component carrier. A UE can perform receiving and sending transmission with an eNB in multiple frequency bands at the same time and still maintain the properties of the LTE release8 in a single frequency band, that is, the LTE-Advanced can be viewed as being formed by "binding" multiple LTE systems.

After introducing the carrier aggregation technology, the available resources of the LTE-Advanced system is greatly extended and the flexibility of uplink scheduling is largely improved, the eNB can allocate resources for a UE in the frequency band of every component carrier.

The LTE-Advanced system can support a maximum uplink transmission bandwidth of 100 MHz and a maximum number of layers of 4 of uplink spatial division multiplexing (the maximum number of layers of uplink spatial division multiplexing supported by the LTE release 8 system is 2), therefore a maximum buffer data volume supported by a UE in the LTE-Advanced is theoretically 10 times as much as that of a UE in the LTE system, the LTE-Advanced thus requires a greater number of bytes to report a BSR. In addition, there maybe a plurality of available component carriers on an uplink of a UE of the LTE-Advanced at the same time, there have not provided specific rules and methods of sending a BSR on a plurality of component carriers. A BSR sending mechanism of the current LTE system is only applicable to a single-carrier system, which cannot meet the demand of the LTE-Advanced system. If the LTE-Advanced system follows the BSR sending mechanism of the LTE system, a BSR will be sent on one component carrier. Because of the difference of the channel quality of different component carriers, the rate of correctly sending a BSR cannot meet the requirement of the LTE-Advanced system when the BSR is sent on only one component carrier. In addition, it will result in large overheads of the system if the BSR is sent on all component carriers. Therefore, the design and the sending mechanism of a BSR in the LTE-Advanced should take both the correct rate and the overheads into consideration.

In the current LTE system, channel quality difference-related information sent by an eNB to a UE is only a Modulation and Coding Scheme (MCS). Every MCS corresponds to a unique combination of a modulation mode and a coding rate. The higher MCS will have a corresponding higher modulation mode or a higher coding rate. Since high communication quality can be achieved only when a higher modulation mode or a higher coding rate are applied to a radio channel with higher quality, normally, the eNB will apply a higher MCS to component carrier radio resources with higher channel quality. In the LTE-Advanced system, there maybe more channel quality difference-related information sent by the eNB to the UE.

In addition, since the maximum buffer data volume supported by a UE in the LTE-Advanced system is far more than that supported by a UE in the LTE system, the current BSR design of the LTE system cannot meet the demand of the LTE-Advanced UE and new BSR types should be designed according to the characteristics of the LTE-Advanced system. Furthermore, since the LTE-Advanced system should maintain the backward compatibility with an LTE UE, the LTE-Advanced system may include both an LTE UE and an LTE-Advanced UE, as well as both BSR types in the LTE and new BSR types; therefore it remains a problem for a network side to distinguish whether a BSR sent by a UE is of a BSR type in the LTE or of a new BSR type.

Therefore, in regard to the aforementioned problems, a method, a corresponding terminal and system for reporting a buffer status report in a system adopting a carrier aggregation technology are required to increase the rate of correctly sending a buffer status report while saving uplink radio resources.

SUMMARY

The technical problem to be solved by the present invention is to provide a method, a terminal and a network system for reporting a buffer status report in a radio network supporting a carrier aggregation technology, to solve the problem of reporting a buffer status report on radio resources of component carriers allocated to a terminal, so as to ensure the rate of correctly sending the buffer status report and save uplink radio resources.

In order to solve the aforementioned problems, the present invention provides the following technical solutions.

The present invention provides a method for reporting a buffer status report, comprising:

a terminal triggering a BSR and obtaining radio resource information of uplink component carriers in a radio network by a terminal;

constructing one or more BSR data units based on information of a buffer data volume to be transmitted; and selecting one or more uplink component carriers from the uplink component carriers with available radio resources, and sending the BSR data unit(s) to a network side on radio resources of the selected uplink component carrier(s).

A trigger condition for triggering a BSR by the terminal may comprise:

on at least one uplink component carrier, the number of bits used for padding on available radio resources of the terminal is greater than or equal to the sum of a bit length required by a method for constructing buffer status information of an LCG or an LCH and a bit length of an MAC sub-header corresponding to the padding bits.

The method may further comprise:

when the terminal constructs the BSR data units according to the information of the buffer data volume to be transmitted, dividing the constructed BSR data units into different types according to content composition of the BSR data units.

when the terminal selects to send the BSR data units on a plurality of uplink component carriers, if there is a plurality of BSR data units to be sent, the plurality of data units are of the same BSR type or of different BSR types.

When the terminal divides the BSR data units into different types according to the content composition of the BSR data units, the content composition of the BSR data units may comprise the following forms:

an object corresponding to buffer status information included in a BSR data unit is buffer status information of an LCG or an LCH;

a BSR data unit only includes buffer status information of one LCG or one LCH of the terminal;

a BSR data units includes buffer status information of part of the LCGs or part of the LCHs of the terminal; or a BSR data units includes buffer status information of all LCGs or all LCHs of the terminal.

When a BSR data units only includes the buffer status information of one LCG or one LCH of the terminal, the BSR may include the serial number information of the LCG or LCH and information of buffer data volume to be transmitted of the LCG or LCH. The length of the information of the buffer data volume to be transmitted is greater than or equal to 6 bits.

When a BSR data unit includes the buffer status information of part of the LCGs or part of the LCHs of the terminal, the BSR data unit may include serial number information of the LCG or LCH, the serial number information represents a bit bitmap of all LCGs or LCHs arranged according to the order of the serial numbers of the LCGs or LCHs, a length of the serial number information is N bits and N is a total number of the LCGs or LCHs, a certain bit in a bit bitmap of an LCG or LCH is 1 or 0 for indicating whether information of a buffer data volume to be transmitted of the LCG or LCH corresponding to the bit is included in the BSR data units; the BSR data unit may further include information of a buffer data volume to be transmitted of a corresponding LCG or LCH in the bit bitmap, a length of the information of the buffer data volume to be transmitted is greater than or equal to 6 bits, and information of buffer data volumes to be transmitted of the LCGs or LCHs is arranged according to the sequence of the LCGs or LCHs in the bit bitmap.

When a BSR data unit includes the buffer status information of all LCGs or LCHs of the terminal, the BSR data unit may include information of buffer data volumes to be transmitted of all LCGs or all LCHs of the terminal, a length of information of a buffer data volume to be transmitted is greater than or equal to 6 bits, and the information of buffer data volumes to be transmitted of the LCG or LCH is arranged according to the sequence of the serial numbers of the LCGs or LCHs.

The length of the information of the buffer data volume to be transmitted may be:

set fixedly in an eNB or on the terminal side; or configured by the eNB and notified to the terminal by a broadcast channel or a special radio resource control (RRC) message; or selected by the terminal according to a total bandwidth of all configured uplink component carriers; the wider the total bandwidth is, the longer length of the information of the buffer data volume to be transmitted may be selected.

The information of the buffer data volume to be transmitted of the LCG(s) or LCH(s) in the BSR represents level information of an actual buffer data volume(s) to be transmitted of the LCG(s) or LCH(s), and a corresponding relation between the level information and the actual buffer data volume(s) to be transmitted of the LCG(s) or LCH(s) may comprise: each level corresponds to a data volume range; data volume ranges corresponding to neighboring levels are continuous; a data volume range corresponding to each level is a fixed value, or an increasing value increasing with level, or a combination of a fixed value and an increasing value;

the corresponding relation is formed by adding a new corresponding relation to a corresponding relation defined by a single carrier technology, or by changing the current corresponding relation defined by the single carrier technology, or by setting a bran-new corresponding relation.

The step of dividing the constructed BSR data units into different types according to content composition of the BSR data units may comprise: if all characteristics and composition methods of content composition of two BSR data units are completely identical, determining that the two BSR data units have the same content composition; if all characteristics and composition methods of content composition of two BSR data units are not completely identical, determining that the two BSR data units have different content composition.

When the terminal has buffer status information of a plurality of LCGs or LCHs, principles of the terminal to select content composition of the BSR units to send may comprise:

at the same moment, the terminal selects and sends buffer status information of as many as possible LCGs or LCHs to the eNB; or at the same moment, the terminal preferably sends buffer status information of an LCG including an LCH with a higher priority or buffer status information of an LCH with a higher priority; or at the same moment, if one or more BSR data units of the terminal have included buffer status information of all LCGs or all LCHs with buffer data to be transmitted, then other BSR data units of the terminal only include buffer status information of part of the LCGs or part of LCHs with buffer data to be transmitted.

The step of selecting one or more uplink component carriers from the uplink component carriers with available radio resources by the terminal may comprise:

when the terminal has available radio resources only on one uplink component carrier, the terminal only selects the uplink component carrier;

when the terminal has available radio resources on multiple uplink component carriers, the terminal selects one or more uplink component carriers from the multiple uplink component carriers.

When the terminal has available radio resources on multiple uplink component carriers, the step of selecting one or more uplink component carriers from the multiple uplink component carriers by the terminal may comprise: determining the number of the uplink component carriers to be selected; the steps of determining the number of the uplink component carriers to be selected may comprise:

14A, selecting only one uplink component carrier with available radio resources by the terminal; or 14B, selecting all uplink component carriers with available radio resources by the terminal; or 14C, determining by the terminal the number of the uplink component carriers to be selected according to an absolute quantitative value; or 14D, determining by the terminal the number of the uplink component carriers to be selected according to a value obtained by multiplying a number of uplink component carriers with available radio resources by a ratio value.

When the terminal has available radio resources on multiple uplink component carriers, the step of selecting one or more uplink component carriers from the multiple uplink component carriers by the terminal may comprise:

selecting an uplink component carrier with channel quality-related information having a higher priority than channel quality-related threshold information by the terminal, according to the channel quality-related information of the radio resource on the uplink component carrier issued by the eNB on the network side and/or the channel quality-related threshold information configured by the eNB.

The absolute quantitative in the step 14C and the value obtained by multiplying the number of the uplink component carriers with radio resources by a ratio value in the step 14D are both greater than or equal to 1.

The channel quality-related information may comprise:

Modulation and Coding Scheme information, signal to interference noise ratio information, signal-to-noise ratio information, packet error rate information, block error rate information or bit error rate information.

The ratio value and the absolute quantitative value may be:
preconfigured on the terminal side; or
configured by the eNB and sent to the terminal by a broadcast message; or
configured by the eNB sent to the terminal by an RRC message, or configured by the eNB and sent to the terminal by an Uplink Grant message; or
configured by the eNB and sent to the terminal through a special MAC control element.

When the terminal has available radio resources on multiple uplink component carriers, the step of selecting one or more uplink component carriers from the multiple uplink component carriers after determining the number of the uplink component carriers to be selected may further comprise:

selecting randomly the determined number of uplink component carriers from the multiple uplink component carriers with available radio resources; or selecting the determined number of uplink component carriers with smaller serial numbers according to a serial number sequence, which is predetermined by the eNB, of the uplink component carriers being used by the terminal; or preferably selecting the determined number of uplink component carriers with higher channel quality according to the uplink component carrier radio resource channel quality-related information issued by the eNB.

BSR data units sent on the multiple uplink component carriers by the terminal are of BSR data unit types defined in a single carrier system or of new BSR data unit types supporting a carrier aggregation technology;

the BSR data units supporting the carrier aggregation technology may comprise: truncated BSR data units including buffer status information of part of the LCGs; short BSR data units including buffer status information of one LCG; or long BSR data units including buffer status information of all LCGs.

At the same transmission moment, BSR data units sent by the terminal on radio resources of multiple uplink component carriers are of BSR data unit types defined in a single-carrier system, or of new BSR data unit types supporting a carrier aggregation technology;

the BSR data unit types supporting the carrier aggregation technology may comprise: truncated BSR data units including buffer status information of part of the LCGs; short BSR data units including buffer status information of one LCG; or long BSR data units including buffer status information of all LCGs.

The aforementioned method may further comprise:

adding identification information corresponding to a BSR type to an MAC sub-header by the terminal, acquiring by an eNB on the network side that the BSR and the type thereof are included in an MAC PDU according to the identification information in the MAC sub-header after receiving the MAC PDU which is sent by the terminal; or changing existing corresponding relation(s) of one or more pieces of identification information in the MAC sub-header by the terminal to correspond to a new BSR data unit type supporting a carrier aggregation technology, and determining whether the MAC sub-header in the MAC PDU sent by the terminal is the MAC sub-header with the changed corresponding relation(s) of identification information by the eNB according to terminal capability information after the terminal reports an RRC layer message including the terminal capability information to the eNB on the network side; or changing existing corresponding relation(s) of one or more pieces of identification information in the MAC sub-header by the terminal to correspond to a new BSR data unit type supporting a carrier aggregation technology, and sending a specific RRC-dedicated message by the eNB to the terminal to notify whether to use the MAC sub-header with the changed corresponding relation(s) of identification information after a Radio Resource Control (RRC) layer link is established between the terminal and the eNB on the network side.

The method may further comprise:

when the terminal has triggered a regular buffer status report and the terminal has no PUSCH resources for sending new data in a current TTI, the terminal triggers an SR;

when the terminal has triggered an SR and there is no available PUSCH resources on any uplink component carrier, the terminal sends the SR in a TTI when there are PUCCH resources and requests the eNB to allocate PUSCH resources for the terminal.

This invention further provides a network system for reporting a BSR, comprising an eNB and a terminal;

the terminal is arranged to acquire radio resource information of uplink component carriers of a radio network, construct one or more BSR data units according to information of a buffer data volume to be transmitted, select one or more uplink component carriers from the uplink component carriers with available radio resources and send the BSR data units on radio resources of the selected uplink component carriers to the eNB;

the eNB is arranged to allocate radio resources of component carriers for the terminal, receive the BSR data units reported by the terminal through radio resources of the uplink component carriers, and analyze the BSR data units to acquire a buffer status of the terminal.

This invention further provides a terminal for reporting a BSR, comprising:

a component carrier radio resource acquisition module arranged to acquire radio resources of uplink component carriers allocated to a terminal by a base station and notify a radio resource selection module of the radio resource information;

a buffer information monitoring module arranged to monitor and acquire information of a buffer data volume to be transmitted of the terminal and notify a buffer status report generating module of the information of the data volume to be transmitted;

a buffer status report generating module arranged to construct one or more BSR data units according to the information of the buffer data volume to be transmitted;

a radio resource selection module arranged to select one or more uplink component carriers for sending the one or more BSR data units from the radio resources acquired from the component carrier radio resource acquisition module and send the selection result to a BSR sending module; and a BSR sending module arranged to send the one or more BSR data units generated by the buffer status report generating module on the radio resources selected by the radio resource selection module to an eNB on the network side.

The buffer status report generating module may be arranged to construct different BSR types according to the information of the buffer data volume to be transmitted, that is, divide BSR data units into different types according to content composition of the BSR data units.

The content composition of the BSR data units comprises the following forms:

the BSR data units only include buffer status information of one LCG or one LCH of the terminal;

the BSR data units include buffer status information of part of the LCGs or part of the LCHs of the terminal; or the BSR data units include buffer status information of all LCGs or all LCHs of the terminal.

Based on the definition of BSR data units in the current LTE, this invention defines new practical types of BSR data units in the LTE-advanced system, and especially providing a determination mechanism for data volume level information applied to the large-capacity of the LTE-advanced system so that the length of the data volume level information is equal to or greater than 6 bits. The present invention adds a trigger condition applicable to the sending of BSRs in the LTE-advanced system and specifically selects one or more component carriers to send the BSR data units with specific forms when the terminal has radio resources of multiple available component carriers.

By applying the multi-carrier system, terminal and BSR reporting method of the present invention, one or more types of BSRs can be generated flexibly according to the situation of component carrier resources allocated to a UE and proper component carriers can be selected to sent the BSRs, so as to ensure the rate of correctly sending the BSRs and save uplink radio resources. The present invention fully takes advantages of the wide bandwidth of the LTE-advanced system, and can realize high-efficiency-and-quality transmission of BSR data units.

BRIEF DESCRIPTION OF THE DRAWINGS

FIG. 9 shows a correspondence table indicative of a correspondence between the level of a buffer data volume to be transmitted and an actual buffer data volume to be transmitted of the present invention;

FIGS. 10A and 10B show a second correspondence table indicative of a correspondence between the level of a buffer data volume to be transmitted and an actual buffer data volume to be transmitted of the present invention;

FIG. 11 shows a third correspondence table indicative of a correspondence between the level of a buffer data volume to be transmitted and an actual buffer data volume to be transmitted of the present invention;

FIG. 18 shows a first schematic diagram of a composition method of BSR data units sent on multiple component carriers of the present invention;

FIG. 19 shows a second schematic diagram of a composition method of BSR data units sent on multiple component carriers of the present invention;

FIG. 20 shows a third schematic diagram of a composition method of BSR data units sent on multiple component carriers of the present invention;

DETAILED DESCRIPTION

In order to make the objectives, technical solutions and advantages of the present invention clearer, the present invention is further described in details with the embodiments and drawings hereinafter.

Based on the definition of BSR data units in current LTE, this invention defines new practical types of BSR data units in an LTE-advanced system, especially providing a determination mechanism for data volume level information that is applicable to the large-capacity of the LTE-advanced system so that the length of the data volume level information can be equal to or greater than 6 bits. In addition, the present invention newly adds trigger conditions applicable to the sending of BSRs in the LTE-advanced system and further provides a specific form of selecting one or more component carriers to send the BSR data units when a terminal has radio resources of multiple available component carriers. The present invention fully takes advantages of the wide bandwidth of the LTE-advanced system, and realizes high-efficiency-and-quality transmission for BSR data units.

Figure 1:
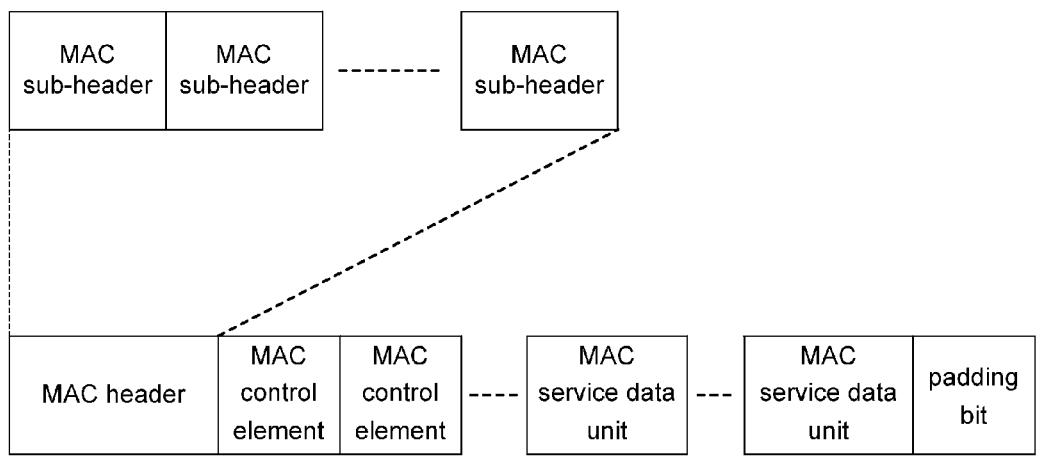
FIG. 1 shows a schematic diagram of an MAC PDU defined by an LTE standard.
Figure 2:
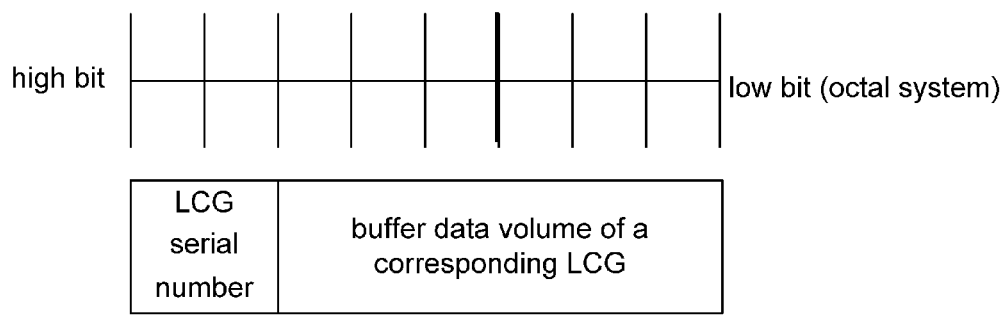
FIG. 2 shows a schematic diagram of a short BSR and a truncated BSR defined by an LTE standard.
Figure 3:
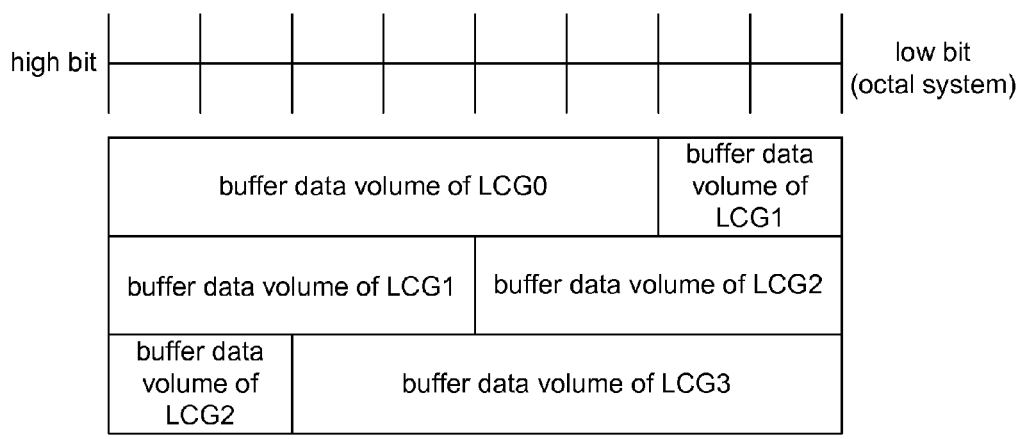
FIG. 3 shows a schematic diagram of a long BSR defined by an LTE standard.
Figure 4:
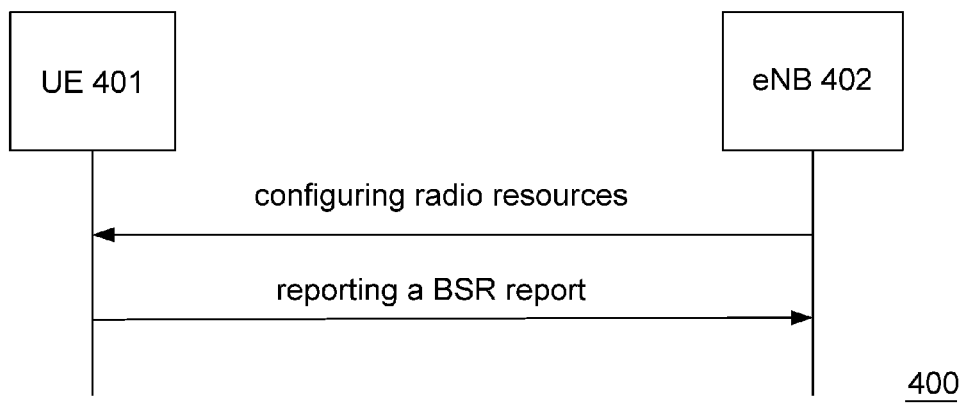
FIG. 4 shows a schematic diagram of a multi-carrier network system applying carrier aggregation of the present invention.

FIG. 4 shows a schematic diagram of a network system used for reporting a buffer status report of the present invention. The network system 400 comprises a UE 401 and an eNB 402, the UE 401 is used for acquiring radio resource information of uplink component carriers of a radio network, constructing one or more BSR data units according to information of a buffer data volume to be transmitted, selecting one or more uplink component carriers from the uplink component carriers with available radio resources and sending the BSR data units on radio resources of the selected uplink component carriers to an eNB;

the eNB 402 is used for allocating component carrier radio resources for a UE, receiving BSR data units reported by the UE through radio resources of uplink component carriers and analyzing the BSR data units to acquire a buffer status of the UE.

Figure 5:
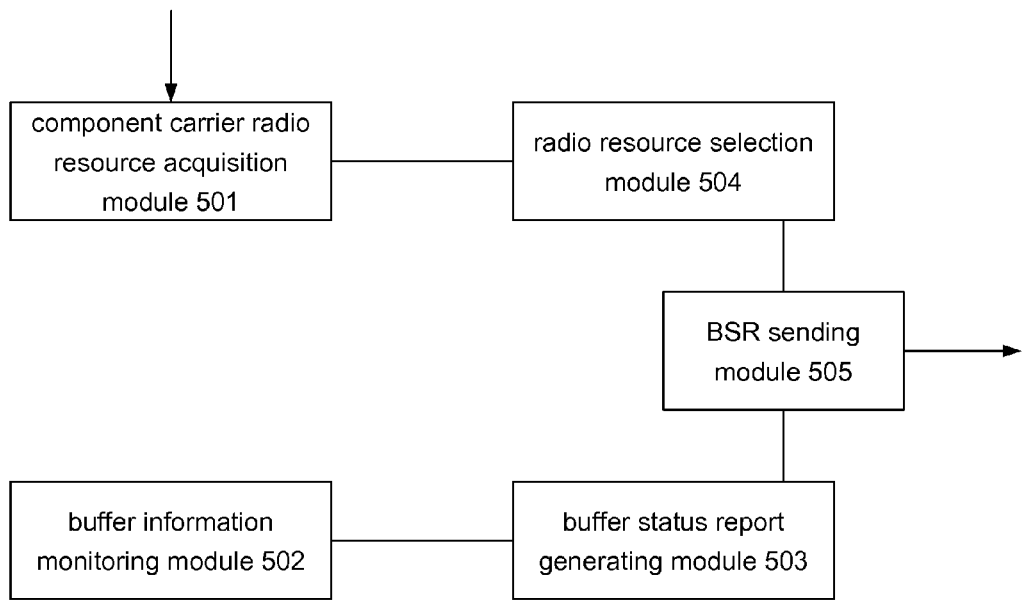
FIG. 5 shows a structural schematic diagram of a terminal in a multi-carrier network system of the present invention.

As shown in FIG. 5, the UE 401 for reporting a buffer status report of the present invention comprises:

a component carrier radio resource acquisition module 501 for acquiring radio resources of uplink component carriers allocated by the base station to the UE and notifying a radio resource selection module 504 of the radio resource information;

a buffer information monitoring module 502 for monitoring information of a buffer data volume to be transmitted of the UE and notifying a buffer status report generating module 503 of the information of the data volume to be transmitted;

a buffer status report generating module 503 for constructing one or more BSR data units according to the information of the buffer data volume to be transmitted;

a radio resource selection module 504 for selecting one or more uplink component carriers for sending one or more BSR data units from the radio resources acquired by the component carrier radio resource acquisition module 501 and sending the selection result to a BSR sending module 505;

a BSR sending module 505 for sending one or more BSR data units generated by the buffer status report generating module 503 on the radio resources selected by the radio resource selection module 504 to the network-side eNB 402.

The eNB and UE in the following embodiments belong to the LTE-Advanced system, supports the carrier aggregation technology and adopts an FDD mode. The design of content composition of a BSR data unit is as follows:

an object corresponding to buffer status information included in the BSR data unit can be an LCG or an LCH. The LCG is taken as an example hereinafter; there are 4 LCGs in the LTE Release 8 system. In order to be compatible with the LTE Release 8 system, there are also 4 LCGs designed in the following embodiments. The eNB performs configuration to allocate an LCH into each LCG, and the configuration method will not influence the technical content of the embodiments of the present invention. Therefore, examples of a BSR that includes LCH buffer status information will not be given especially in the embodiments of the present invention.

The BSR data unit can include buffer status information of one LCG, or of all LCGs or of part of the LCGs.

Figure 6:
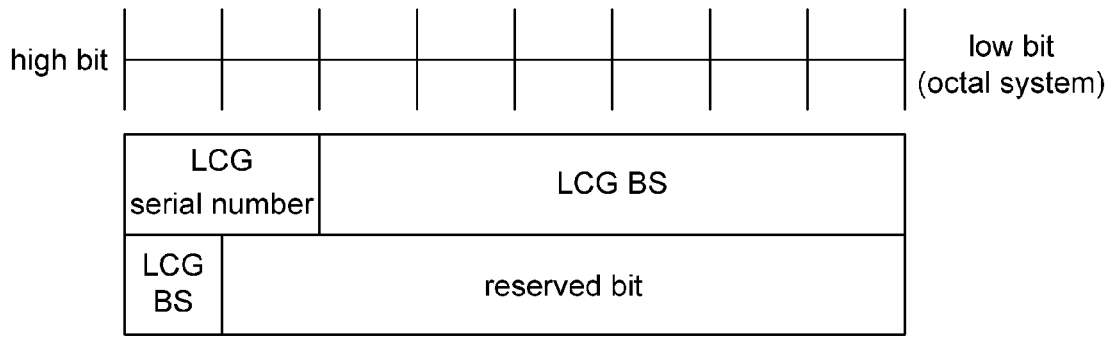
FIG. 6 shows a schematic diagram of a BSR data unit including buffer status information of only one LCG of the present invention.
Figure 7:
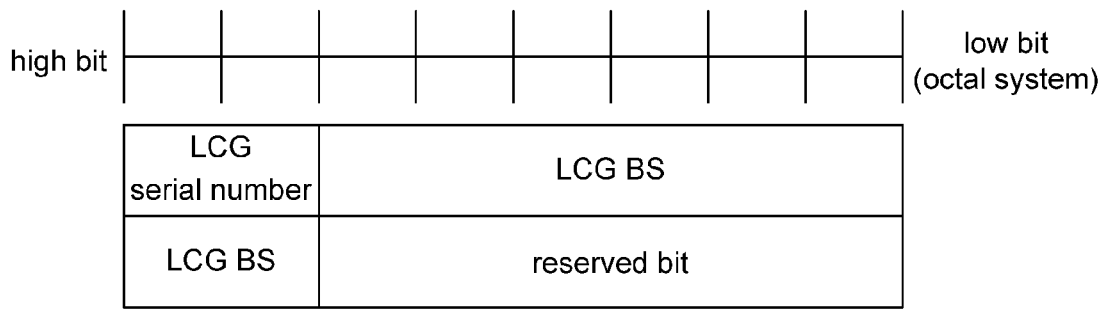
FIG. 7 shows a second schematic diagram of a BSR data unit including buffer status information of only one LCG of the present invention.
Figure 8:
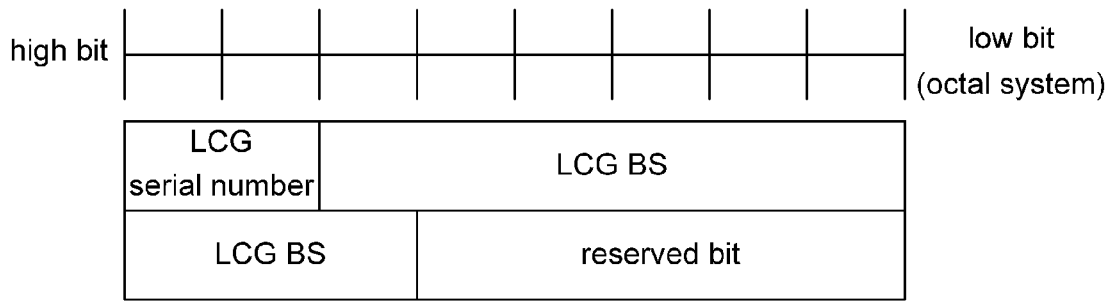
FIG. 8 shows a third schematic diagram of a BSR data unit including buffer status information of only one LCG of the present invention.

Embodiment 1:

The characteristics of the composition method of the BSR data unit including buffer status information of only one LCG are as follows: LCG serial number information is included, whose length is log2N bits, wherein N is the total number of the LCGs; the BSR further includes level information of a buffer data volume to be transmitted of the LCG corresponding to the serial number, the length of level information of a buffer data volume to be transmitted of every LCG depends on how to classify the ranges of the buffer data volumes to be transmitted of the LCGs, the range of a buffer data volume to be transmitted is classified by the current LTE Release 8 standard into 64 levels (namely, the length of the level information of the data volume is 6 bits), and the maximum accurate actual buffer data volume that can be represented is 150000 bytes; provided in this embodiment that the maximum accurate actual buffer data volume required to be supported is 10 times as much as that in the LTE Release 8 standard, that is 1500000 bytes (see the description in the LTE-Advanced system in the technical background), the length of the data volume level information is at least not less than 6 bits. An embodiment applying 7 bits is as shown in FIG. 6, wherein LCG BS represents the level of a buffer data volume to be transmitted of an LCG corresponding to a LCG serial number. An embodiment applying 8 bits is as shown in FIG. 7 and an embodiment applying 9 bits is as shown in FIG. 8. Embodiments applying more bits can refer to the method described in the aforementioned embodiments, and examples will not be given repeatedly here.

Embodiment 2:

A method for a correspondence between the level of a buffer data volume to be transmitted and an actual buffer data volume to be transmitted is as follows: every level is corresponding to a data volume range and data volume ranges corresponding to neighboring levels are continuous; each data volume range corresponding to each level can be a fixed value, or an increasing value increasing with level, or a combination of the aforementioned two methods. The corresponding relation in a BSR, described in the present invention, between the level of a buffer data volume to be transmitted and an actual buffer data volume to be transmitted can be formed by adding a new corresponding relation to a corresponding relation defined by the current technology (LTE release 8), or by changing the corresponding relation defined by the current technology, or by setting a new corresponding relation.

Taking a level length of 7 bits and a data volume range corresponding to every level increasing with level as an example, an embodiment of a corresponding relation between the level of a buffer data volume to be transmitted and an actual buffer data volume to be transmitted can be as shown in a table in FIG. 9. Every level in the table indicates that the upper limit of the range of the buffer data volume to be transmitted is increased by 17% on the basis of the lower limit, and there are 79 levels in total, which need to be represented by 7 bits. The accurate buffer data volume to be transmitted, which is represented by the highest level, is 1500000 bytes.

Taking a level length of 8 bits and a data volume range corresponding to each level adopting the combination of a fixed value and an increasing value as an example, a corresponding relation between the level of a buffer data volume to be transmitted and an actual buffer data volume to be transmitted of an LCG is as shown in a table in FIGS. 10A and 10B. The former 63 levels in the table are set by the same method as in FIG. 9, data volume ranges represented by the latter levels are fixed 10000 bytes respectively. There are 131 levels in total and represented by 8 bits. The accurate buffer data volume to be transmitted, which is represented by the highest level, is 1500000 bytes.

A corresponding relation table indicative of a correspondence between LCG buffer levels and data volume ranges in the current LTE release 8 has only 64 levels and the maximum buffer data volume that can be accurately represented is only 150000 bytes. The aforementioned 2 embodiments both add a new level definition to the corresponding relation table indicative of a correspondence between the levels and the data volume ranges in the current LTE release 8, that is, the definition of the former 64 levels in the aforementioned two embodiments is the same as the definition in the LTE release 8.

Of course, the setting of 64 levels can still be applied (which needs a level length of only 6 bits) but a new corresponding relation is set, for example, the upper limit of a buffer data volume range represented by each level is increased by 170% on the basis of the lower limit, the corresponding relation table having 64 levels can represent a maximum actual buffer data volume of 1500000 bytes. The implementation method of the embodiment can refer to the embodiment of FIG. 9 and a schematic diagram will not be given here.

A method for setting the level of the length of 8 bits, 9 bits or more bits can refer to the examples of 7 bits and 6 bits, and examples will not be given here.

The same method as in the aforementioned embodiments can also be adopted to support smaller or greater buffer data volume, and examples will not be given here.

Embodiment 3:

In addition, the LTE release 8 system-defined correspondence table indicative of a correspondence between LCG buffer data levels and data volume ranges can still be applied, but the definition of the corresponding relations in the table is changed so that the table can accurately represent a maximum LCG buffer data volume of 750000 bytes. For example, this embodiment reserves the LTE release 8 system-defined corresponding relation table indicative of a correspondence between LCG buffer levels and data volume ranges. As shown in FIG. 11, a composition method of a BSR data unit of this embodiment applies the method as shown in FIG. 8 (the LCG buffer data volume length is represented by 9 bits). The corresponding relation table illustrated in FIG. 11 has only 64 levels which can accurately represent 150000 bytes at most. A new defined relation is added in this embodiment as follows:

Level of buffer data volume to be transmitted =

$$\left\lfloor \frac{F}{G} \right\rfloor \times (M+1) + f(F \% G),$$

wherein M is the maximum level 63 of the corresponding table, F is the actual buffer data volume to transmitted of the LCG, G is the lower limit of a data volume range represented by level M, $\lfloor \ \rfloor$ is an operation of rounding down to the nearest integer, "%" is a modular operation, f( ) is a table lookup operation, namely looking up a level corresponding to a data volume "F%G" according to the aforementioned corresponding relation table.

After the eNB receives the level information, the actual data volume corresponding to the level information is calculated according to the following formula:

Actual buffer data volume to be transmitted of LCG =

$$\left\lfloor \frac{H}{M+1} \right\rfloor \times G + f'(H \% (M+1)),$$

wherein H is the level of a buffer data volume to be transmitted of the LCG, f'( ) is a table lookup operation, namely looking up the range of the actual buffer data volume to be transmitted corresponding to "H%M" according to the aforementioned corresponding relation. The corresponding relation between buffer data levels and an actual buffer data volume is changed into the formula above so that the current corresponding relation having 64 levels can represent an actual buffer data volume of 1500000 bytes and the number of the corresponding buffer data volume levels can reach 640. By applying the corresponding relation formula of this embodiment, even more levels or greater actual buffer data volume can be supported.

The meaning of the aforementioned formula is further explained by substituting variables in the formulae with specific values as follows:

provided that an LCG of the UE has a data volume to be transmitted of 700000 bytes, the data volume level of the LCG in a BSR reported by the UE is:

$$\left\lfloor \frac{700000}{150000} \right\rfloor \times (63+1) + f(700000 \% 150000) = 316;$$

in reverse, after the eNB receives the level of buffer data volume to be transmitted of the LCG, the represented actual data volume range can be calculated as follows:

$$\left\lfloor \frac{316}{63+1} \right\rfloor \times 150000 + f(316\%(63+1)) = (693479, 709439] \text{ bytes},$$

700000 bytes are within the range. Even if the LCG of the UE has a greater data volume to be transmitted, the formula above can support a corresponding relation of the corresponding level of the data volume. By applying the method of this embodiment, it is not required to set a new corresponding relation between a buffer data volume level and a data volume range, and the compatibility with the LTE release 8 standard is better. The bit length of buffer data volume level information of the embodiment is 10 bits (representing 640 levels). Of course, if the maximum buffer data volume to be supported is relatively small, the bit length of the corresponding buffer data volume level information can be reduced. If the maximum buffer data volume to be supported is greater, the bit length of the corresponding buffer data volume level information needs to be increased.

Embodiment 4:

A composition method of buffer status information of part of the LCGs of the UE has the following characteristics: the BSR includes serial number information of the LCGs, wherein the information represents a bit bitmap of all LCGs arranged according to the sequence of the LCGs, the length of the information is N bits and N is the total number of the LCGs; if a certain bit in the bit bitmap of the LCGs is 1 (or 0), then it indicates that information of a buffer data volume to be transmitted of a corresponding LCG is included in the BSR; if a certain bit in the bit bitmap of the LCGs is 0 (or 1), then it indicates that information of the buffer data volume to be transmitted of the corresponding LCG is not included in the BSR; the BSR further includes level information of the buffer data volume to be transmitted of the corresponding LCG in the bit bitmap, and level information of buffer data volumes to be transmitted of the LCGs is arranged according to the sequence of the information in the bit bitmap.

Figure 12:
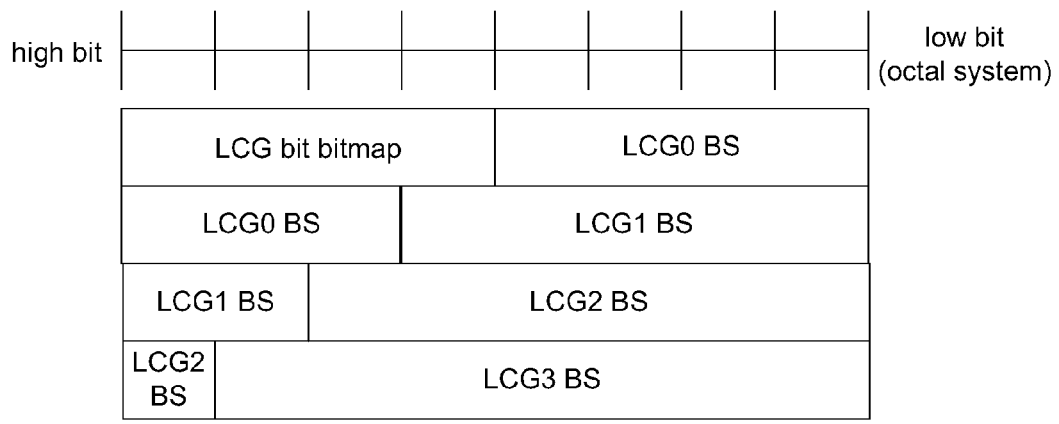
FIG. 12 shows a schematic diagram of a BSR data unit including buffer status information of part of LCGs of the present invention.

Taking the length of level information of a buffer data volume to be transmitted being 7 bits as an example, an embodiment of a design of a BSR data unit is as shown in FIG. 12, if the bit bitmap of the LCGs is "1010", it represents that the BSR includes the levels of buffer data volumes to be transmitted of LCG0 and LCG2 and the length of the BSR is 3 bytes in total; if the bit bitmap is "0001", it represents that the BSR only includes the level of a buffer data volume to be transmitted of LCG3 and the length of the BSR is 2 bytes. The levels of buffer data volumes to be transmitted of all LCGs are arranged according to the serial numbers of the LCGs. A design method in other embodiments with a different length of level information of a buffer data volume to be transmitted can refer to this embodiment, so repeated examples will not be given here. A design of a corresponding relation between the level of a buffer data volume to be transmitted and an actual buffer data volume to be transmitted is the same as that in the aforementioned embodiments, so repeated examples will not be given here.

Embodiment 5:

A composition method of buffer status information of all LCGs of the UE has the following characteristics: the BSR includes level information of buffer data volumes to be transmitted of all LCGs of the UE, and the level information of buffer data volumes to be transmitted of the LCGs is arranged according to the serial numbers of the LCGs.

Figure 13:
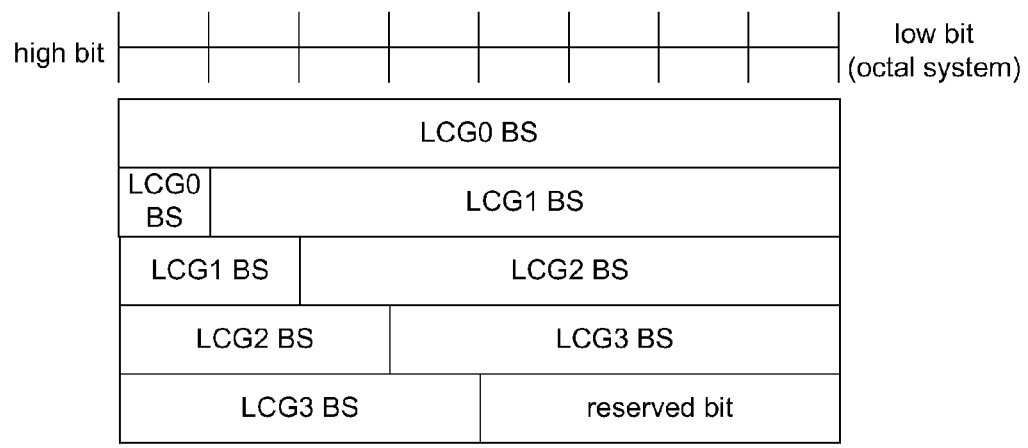
FIG. 13 shows a schematic diagram of a BSR data unit including buffer status information of all LCGs of the present invention.

Taking the length of level information of a buffer data volume to be transmitted being 9 bits as an example, an embodiment of a design of a BSR data unit is as shown in FIG. 13. Since the BSR data unit has included buffer data volume level information of all LCGs, serial number information of the LCGs is not required. The buffer data volume level information of all the 4 LCGs is arranged according to the serial numbers of the LCGs. The total length of the BSR data unit is fixed to be 5 bytes. The BSR data unit is required to include the buffer data volume level information of all LCGs (the buffer data volume level information of LCGs without buffer data to be transmitted is 0) even if not all LCGs have buffer data to be transmitted. Other embodiments with a different length of level information of a buffer data volume to be transmitted can refer to this embodiment, so repeated examples will not be given here. A design of a corresponding relation between the level of a buffer data volume to be transmitted and an actual buffer data volume to be transmitted is the same as that in the aforementioned embodiments, so repeated examples will not be given here.

Embodiment 6:

If an object corresponding to buffer status information included in a BSR data unit is an LCH, a design method can refer to the aforementioned embodiments of an LCG. The only difference is that the number of the LCHs is greater than the number of the LCGs, that is, when the object is an LCH, the length of the serial numbers of the LCHs included in the BSR unit is longer. A design method of the length of level information of a buffer data volume to be transmitted of an LCH included in the BSR data unit is the same with that of an LCG, so repeated examples of the method of an LCH will not be given here.

Figure 14:
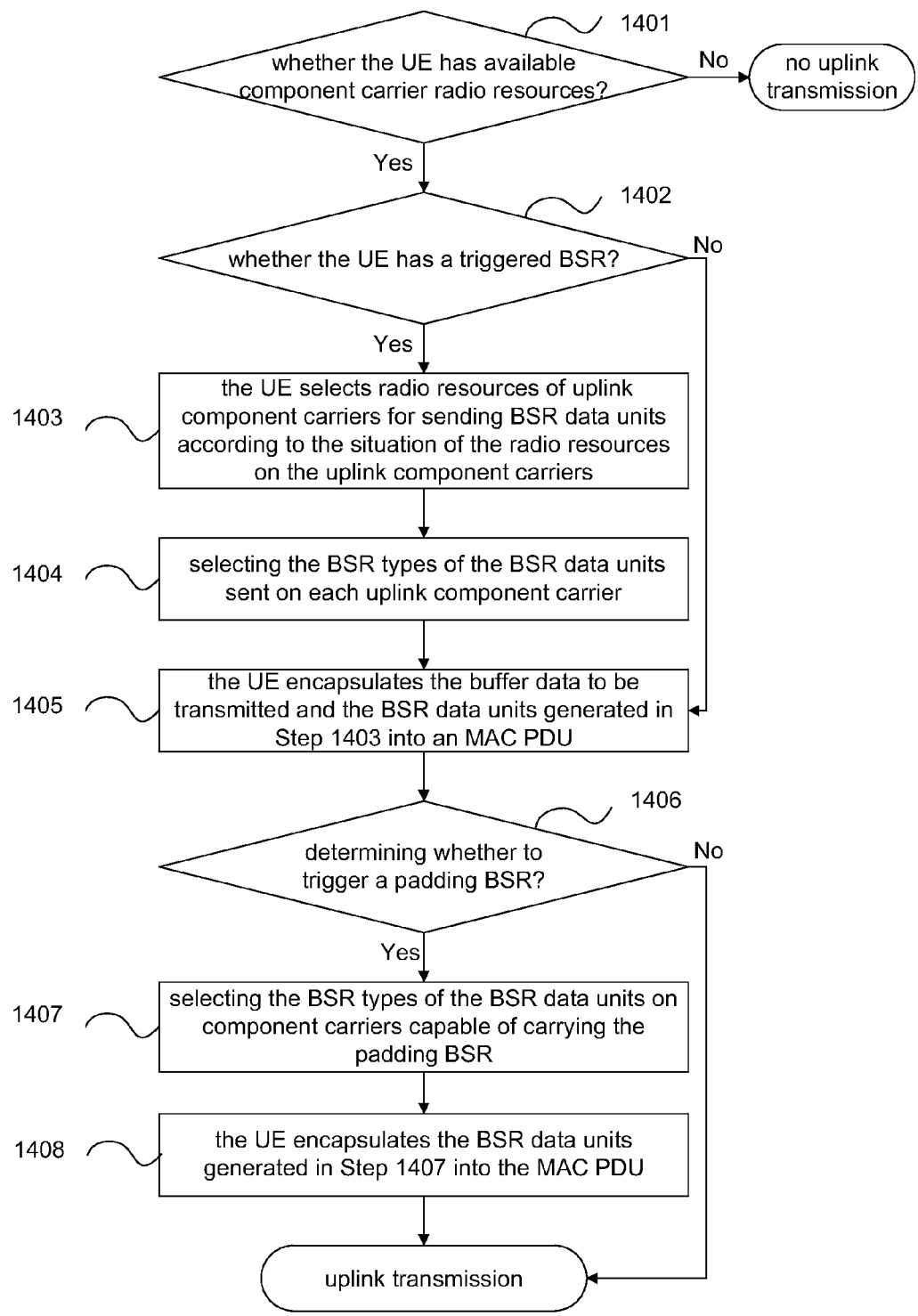
FIG. 14 shows a flowchart of constructing and sending a BSR data unit of the present invention.
Figure 15:
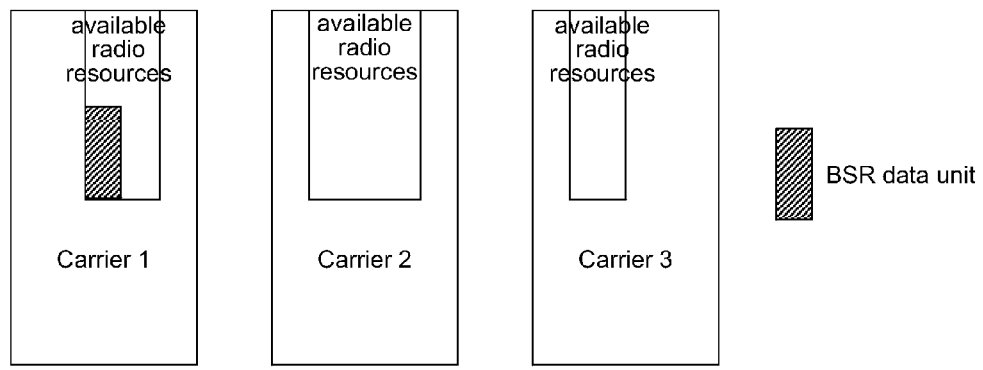
FIG. 15 shows a schematic diagram of sending BSR data units on radio resources of one uplink component carrier of the present invention.
Figure 16:
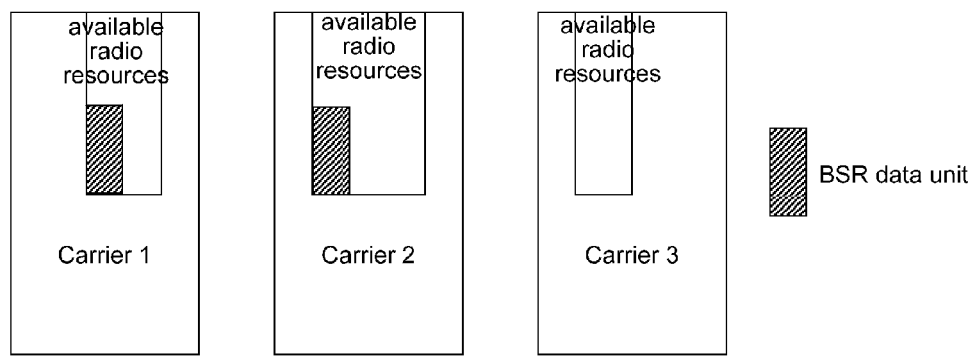
FIG. 16 shows a schematic diagram of sending BSR data units on radio resources of part of uplink component carriers of the present invention.
Figure 17:
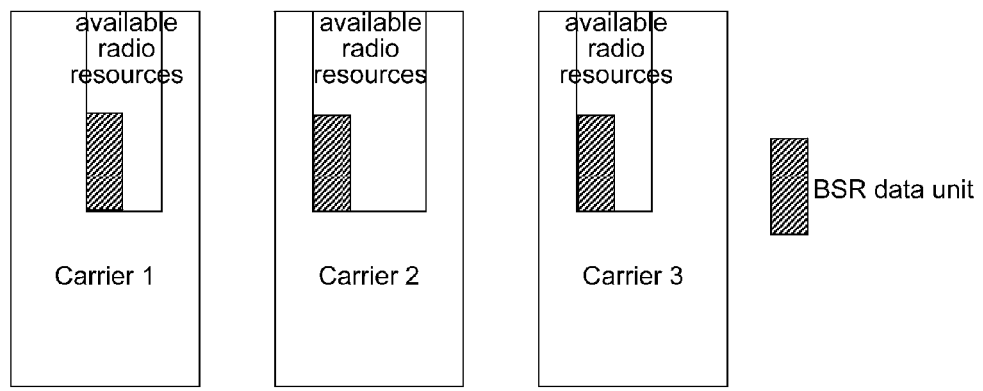
FIG. 17 shows a schematic diagram of sending BSR data units on radio resources of all uplink component carriers of the present invention.

Embodiment 7:

A basic flow of constructing and sending BSR data units by the UE is as shown in FIG. 14 and executed in every TTI, comprising the following steps:

Step 1401: determining whether there are available uplink radio resources for the UE in a current TTI; if there are available uplink radio resources, the next step will be executed; if there are no available uplink radio resources, the UE does not perform uplink transmission in the current TTI;

Step 1402: determining whether the UE has a triggered BSR; if the UE has a triggered BSR, going to the next step, otherwise, going to Step 1405;

Step 1403: selecting and sending radio resources of uplink component carriers of the BSR data units by the UE according to the situation of the radio resources of the uplink component carriers; when the UE has available radio resources on only one uplink component carrier, the UE sends the BSR data units on radio resources of the component carrier; when the UE has available radio resources on multiple uplink component carriers, the UE can select radio resources of one uplink component carrier to send the BSR data units, taking FIG. 15 as an example, or select radio resources of multiple uplink component carriers to send the BSR data units, taking FIG. 16 and FIG. 17 as examples. There are many implementation methods for Step 1403, specifically comprising:

when the UE has multiple component carriers with available radio resources, the UE can send the BSR data units on only one component carrier, or send the BSR data units on all component carriers, or select the number of the component carriers for sending the BSR data units according to an absolute quantitative value, or select the number of the component carriers for sending the BSR data units according to a value obtained by multiplying the number of the uplink component carriers with available radio resources by a ratio value, or select radio resources of an uplink component carrier with higher channel quality than a threshold according to uplink component carrier radio resource channel quality-related information issued by the eNB and the channel quality-related threshold configured by the eNB to send the BSR data units.

The absolute quantitative value, the ratio value or the threshold information can be preconfigured on the UE side, or configured by the eNB and sent to the UE through a broadcast message, an RRC message, an Uplink Grant message or an MAC control element.

The channel quality-related information can be an MCS, signal to interference noise ratio information, signal to noise ratio information, packet error rate information, block error rate information or bit error rate information.

For example, if the UE has 3 uplink component carriers with available resources in the current TTI, the MCSs of the available resources are 10, 15, and 21 respectively, the eNB sends an RRC message to notify the UE that an MCS threshold is 12, then the UE selects the last 2 component carriers to carry the BSR data units.

For example, if the UE has 3 uplink component carriers with available resources in the current TTI, the system sets that the UE only uses one uplink component carrier to send the BSR, then the UE randomly selects an uplink component carrier to carry the BSR data units.

For example, if the UE has 3 uplink component carriers with available resources in the current TTI, the eNB sends a broadcast message to notify the UE to select uplink component carriers to send the BSR according to a ratio of 1:3, the signal to interference noise ratios of the uplink component carriers issued by the eNB through Uplink Grant are 15 dB, 12 dB and 10 dB, respectively, then the UE selects a component carrier with the largest signal to interference noise ratio to send the BSR data units. The eNB can also issue signal-to-noise ratio information, packet error rate information, block error rate information or bit error rate information, the method is the same as that in the aforementioned embodiments and repeated examples will not be given here.

For example, if the UE has 3 uplink component carriers with available resources in the current TTI, the system allows the UE to send the BSR on all uplink component carriers with available resources and the UE selects all component carriers to carry the BSR data units.

After the UE determines the number of component carriers for sending the BSR data units, a method for selecting component carriers from multiple component carriers for sending the BSR data units using radio resources thereof comprises:

selecting randomly; selecting in order according to the sequence of the serial numbers of the component carriers; or selecting radio resources of uplink component carriers with higher channel quality to send the BSR. The first and third methods in the aforementioned methods have been adopted in the aforementioned embodiments and the second method also can be applied in the embodiments above, so additional examples will not be given here.

Step 1404: selecting the BSR types of BSR data units sent on all uplink component carriers. Multiple BSR data units sent on multiple uplink component carriers can be of the same or different BSR types.

For example, if the UE selects 3 uplink component carriers to send the BSR data units in Step 1403 and the LCG0, LCG1 and LCG3 of the UE have buffer data to be transmitted, the composition method of the BSR data units on these three component carriers can be selected as FIG. 18, that is, every BSR data unit includes buffer status information of all LCGs; or can be selected as FIG. 19, that is, every BSR data unit includes buffer status information of only one LCG and the BSR data units on the three carriers include the buffer status information of all LCGs with buffer data to be transmitted; or can be selected as FIG. 20, that is, BSR data units including buffer status information of all LCGs are sent on one of the carriers, and BSR data units including buffer status information of part of the LCGs or one LCG are sent on the other two carriers.

The length of level information of a buffer data volume to be transmitted of an LCG is 9 bits respectively in the aforementioned three embodiments or other length. The length of the level information can be fixedly set on the eNB or UE side, or configured by the eNB and notified to the UE by a broadcast channel or a special RRC message, or selected by the UE according to the total bandwidth of all uplink component carriers of the UE configured by the system, wherein the wider the total bandwidth is, the longer information length of the buffer data volume to be transmitted is selected.

For example, when the total bandwidth of all uplink component carriers configured by the eNB for the UE is less than 20 MHz, the length of level information of a buffer data volume to be transmitted of an LCG of a BSR data unit, which is selected by the UE, is 6 bits; when the total bandwidth of all uplink component carriers configured by the eNB for the UE is between 20 MHz and 40 MHz, the length of level information of the buffer data volume to be transmitted of the LCG is 7 bits; when the total bandwidth of all uplink component carriers configured by the eNB for the UE is between 60 MHz and 80 MHz, the length of level information of the buffer data volume to be transmitted of the LCG is 8 bits. The aforementioned examples are not absolute methods to select the length of level information of a buffer data volume to be transmitted. If a corresponding relation between the level of a data volume to be transmitted and an actual data volume is set differently, the appropriate length of level information is also different, for example, if an actual data volume range corresponding to the level of every transmitted data volume is set relatively small, a relatively long level information length is required.

Examples of other methods for setting a level information length will not be given.

Step 1405: encapsulating the buffer data to be transmitted and the BSR data units generated in Step 1403 into an MAC PDU by the UE, that is, the UE encapsulates the buffer data to be transmitted into an SDU in the MAC PDU of every component carrier according to the volume of the available resources on each component carrier and encapsulates the BSR data units selected in Step 1403 into a CE in the MAC PDU;

Step 1406: determining whether to trigger a padding BSR which is a BSR carried by padding bits of the MAC PDU; the determining conditions are as follows: at least on one uplink component carrier, the number of bits used for padding is greater than or equal to the sum of a bit length required by a composition method of buffer status information including one LCG and a bit length of an MAC sub-header corresponding to the padding bits. If a padding BSR is to be triggered, going to Step 1407, otherwise, performing uplink transmission directly.

A padding BSR is a supplementation to other types of BSRs. If an MAC PDU has included a non-padding BSR, a padding BSR will not be allowed to be included.

Figure 21:
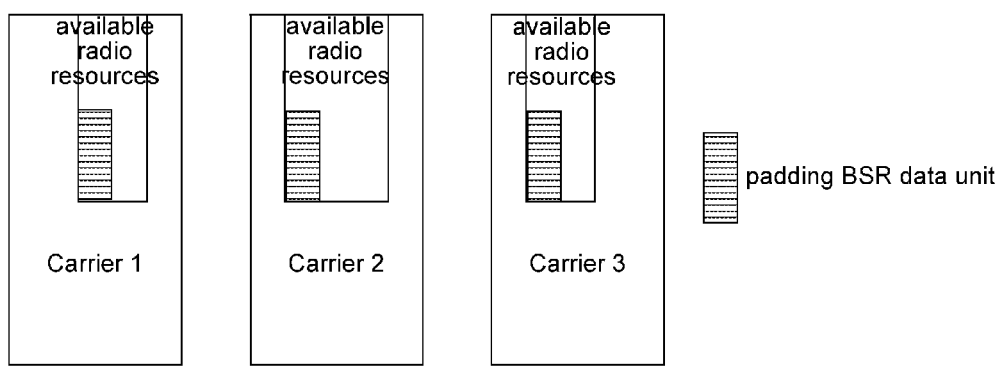
FIG. 21 shows a first schematic diagram of sending a padding BSR data unit on multiple component carriers of the present invention.
Figure 22:
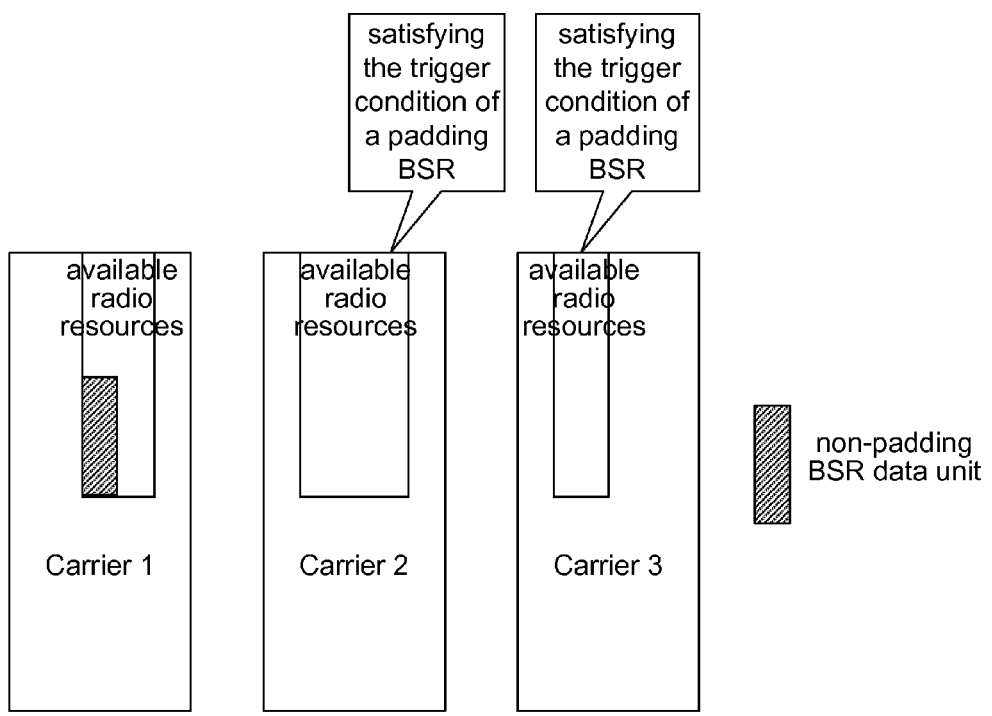
FIG. 22 shows a second schematic diagram of sending a padding BSR data unit on multiple component carriers of the present invention.
Figure 23:
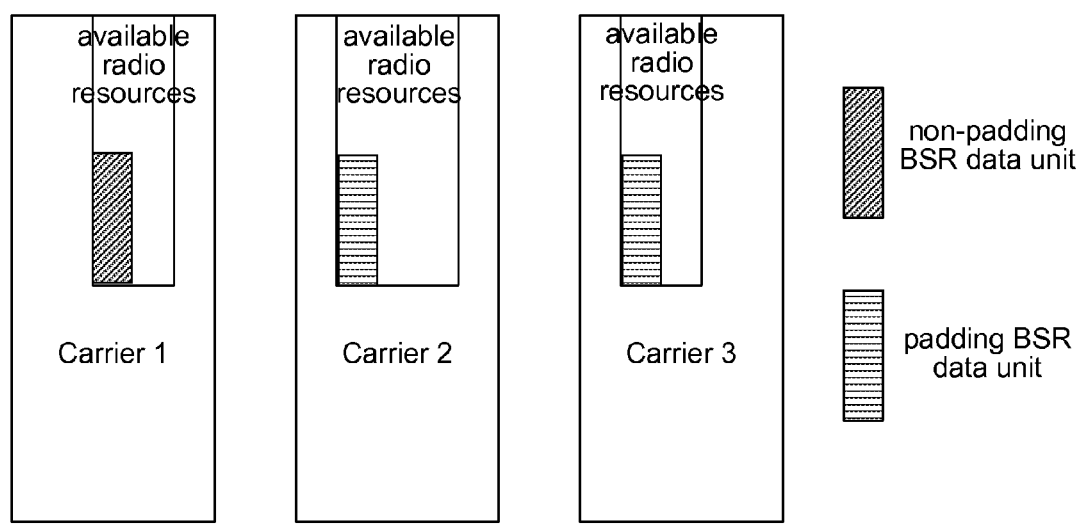
FIG. 23 shows a schematic diagram of sending a padding BSR data unit on multiple component carriers of the present invention.

According to the content of the present invention, besides the component carriers carried with non-padding BSR data units, if there are other component carriers satisfying a trigger condition of a padding BSR, methods for determining whether to trigger a padding BSR comprise one of the followings:

if there are component carriers satisfying the trigger condition of a padding BSR and there are no non-padding BSRs to be sent in the current TTI, a padding BSR is triggered; if there are non-padding BSRs to be sent, a padding BSR will not be triggered;

or if there are component carriers satisfying the trigger condition of a padding BSR and there are non-padding BSRs to be sent in the current TTI, a padding BSR is still triggered;

an example of the first method is as follows: if the UE has 3 uplink component carriers with available resources in the current TTI and there is no triggered non-padding BSR in the UE, then the UE selects all the 3 available component carriers to send the padding BSR, as shown in FIG. 21;

another example: if the UE has 3 uplink component carriers with available resources in the current TTI, and the UE has a component carrier carried with a non-padding BSR data unit and the other two component carriers satisfy the trigger condition of a padding BSR, then the UE will still not trigger a padding BSR, as shown in FIG. 22;

an example of the second method is as follows: if the UE has 3 uplink component carriers with available resources in the current TTI, and the UE has a component carrier carried with a non-padding BSR data unit and the other two component carriers satisfy the trigger condition of a padding BSR, then the UE triggers a padding BSR and selects the other 2 available component carriers to carry the padding BSR, as shown in FIG. 23;

Step 1407: selecting the BSR types of the BSR data units on the component carries capable of carrying padding BSRs; the method for selecting the types of the padding BSR data units is the same as the method for selecting the types of non-padding BSR data units, the only difference is that, the composition method of the padding BSR data units is required to be selected according to the number of the padding bits of the MAC PDU where the padding BSR data units are located. If the number of the padding bits can carry buffer status information of all 4 LCGs, the BSR data units can be composed according to the method of FIG. 13; if the number of the padding bits can carry buffer status information of one LCG, the BSR data units can be composed according to the method of FIG. 6, FIG. 7 and FIG. 8; if the number of the padding bits can carry buffer status information of part of the LCGs, the BSR data units can be composed according to the method of FIG. 12. Since many embodiments have been described above, repeated examples will not be given here.

Step 1408: encapsulating the BSR data units generated in Step 1407 into the MAC PDU by the UE;

performing uplink transmission after the UE encapsulates and packages all data and all BSR data units.

Embodiment 8:

The BSR data units designed by the present invention can be applied to the LTE-Advanced system supporting the carrier aggregation technology and are different from the BSR types in the current LTE Release 8 standard, therefore after a certain UE sets up a connection with the eNB in the LTE-Advanced system, a method for the eNB to determine whether the BSR data units sent by the UE apply the types defined by the LTE Release 8 standard or new types added by the present invention comprises:

a piece of identification information corresponding to a BSR type is added to an MAC sub-header, after the eNB receives an MAC PDU from the UE, it can acquire that the MAC PDU includes the BSR according to the identification information in the MAC sub-header. For example, the definition of the following table is added to a logical channel ID field in the MAC sub-header of the uplink MAC PDU:

| Serial number | logical channel ID field |
|---|---|
| 10111 | truncated BSR data units supporting the carrier aggregation technology, namely including buffer status information of part of the LCGs. |
| 11000 | short BSR data units supporting the carrier aggregation technology, namely including buffer status information of one LCG. |
| 11001 | long BSR data units supporting the carrier aggregation technology, namely including buffer status information of all LCGs. |

The logical channel ID field is used for informing the eNB of the type of the BSR carried by the MAC CE corresponding to the MAC sub-header in the MAC PDU. After receiving the MAC sub-header, the eNB can learn the type of the BSR sent by the UE is the one in the LTE release 8 standard or in the present invention. The serial numbers 10111, 11000 and 11001 are reserved bits of the logical channel ID field and can be used as a new definition.

Or, the existing corresponding relation of one or multiple pieces of identification information in the MAC sub-header is changed to be corresponding to the BSR types in the present invention. After the UE reports an RRC message including UE capability information to the eNB, the eNB determines whether the MAC sub-header in the MAC PDU sent by the UE is the MAC sub-header which has changed the corresponding relation of the identification information according to the UE capability information. For example, the original definition of the logical channel ID field in the MAC sub-header of the uplink MAC PDU is changed into the definition in the following table:

| Serial number | logical channel ID field |
|---|---|
| 11100 | Truncated BSR (or truncated BSR data units supporting the carrier aggregation technology, namely including buffer status information of part of the LCGs) |
| 11101 | Short BSR (or short BSR data units supporting the carrier aggregation technology, namely including buffer status information of one LCG) |
| 11110 | Long BSR (or long BSR data units supporting the carrier aggregation technology, namely including buffer status information of all LCGs) |

The serial numbers 11100, 11101, and 11110 are used for identifying a truncated BSR, a short BSR and a long BSR in the LTE release 8 standard. In this sample, a new definition is given to these three serial numbers (namely the definition given in the brackets). After receiving a message including UE capability information, when the eNB learns that the UE is an LTE UE, the eNB determines that the BSRs subsequently sent by the UE all apply the definition specified by the LTE release 8 standard; when the eNB learns that the UE is an LTE advanced UE, the eNB determines that the BSRs subsequently sent by the UE apply the definition described in the brackets.

Or, the existing corresponding relation of one or more identification information in the MAC sub-header is changed to be corresponding to the BSR types in the present invention. The method is the same as the aforementioned method and can refer to the example of the table above. After the UE sets up an RRC-layer connection with the eNB, the eNB sends an RRC-dedicated message to notify the UE whether to use the MAC sub-header with changed corresponding relation of identification information. For example, when the UE learns that the UE is an LTE-Advanced UE and the eNB configures multiple uplink component carriers for the UE, then the eNB can notify the UE to use the definitions in the brackets of the table above by an RRC message; if the eNB configures only one uplink component carrier for the UE, then the eNB can notify the UE to use the definitions in the brackets of the table above or notify the UE to use the definitions in the LTE release 8 standard.

This invention defines new and practical formats of BSR data units of the LTE-Advanced system, especially providing mechanisms for determining data volume level information, which is applied to the characteristic of large capacity of the LTE-Advanced system, so that the length of the data volume level information can be equal to or greater than 6 bits.

The present invention further adds trigger conditions of sending a BSR in the LTE-advanced system and specifically selects one or more component carriers to send BSR data units with specific forms when the terminal has radio resources of multiple available component carriers. The present invention fully takes advantages of the wide bandwidth of the LTE-advanced system, and can realize high-efficiency-and-quality transmission of BSR data units.

What are described above are only preferred embodiments of the present invention and are not for limiting the present invention, and for those skilled in the art, there can be various modifications and changes to the present invention without departing from the spirit and essence of the present invention. Any modification, equivalent substitute and improvement made within the spirit and principle of the present invention should be included in the protection scope of the present invention.

Industrial Practicability

By applying the multi-carrier system, terminal and BSR reporting method of the present invention, one or more BSR types can be generated flexibly according to the situation of the component carrier resources allocated to a UE and suitable component carrier resources are selected to ensure the rate of correctly sending BSRs and save uplink radio resources. The present invention fully takes advantages of wide bandwidth of the LTE-advanced system, and can realize high-efficiency-and-quality transmission of BSR data units.

The invention claimed is:

1. A method for reporting a buffer status report, comprising:
    triggering a buffer status report (BSR) and obtaining radio resource information of uplink component carriers in a radio network by a terminal;
    constructing one or more BSR data units based on information of a buffer data volume to be transmitted; and
    selecting one or more uplink component carriers from the uplink component carriers with available radio resources, and sending, on radio resources of the selected uplink component carrier(s), the BSR data unit(s) to a network side;
    wherein the selecting one or more uplink component carriers comprises:
    when the terminal has available radio resources only on one uplink component carrier, only selecting, by the terminal, the one uplink component carrier; and
    when the terminal has available radio resources on multiple uplink component carriers, selecting, by the terminal, an uplink component carrier with channel quality-related information having a higher priority than channel quality-related threshold information, according to the channel quality-related information of the radio resource on the uplink component carrier issued by an evolved base station (eNB) on the network side and/or the channel quality-related threshold information configured by the eNB.

2. The method according to claim 1, wherein a trigger condition for triggering a BSR by the terminal comprises:
    on at least one uplink component carrier, the number of bits used for padding on available radio resources of the terminal is greater than or equal to the sum of a bit length required by a method for constituting buffer status information of a logical channel group (LCG) or a logical channel (LCH) and a bit length of an MAC sub-header corresponding to the padding bits.

3. The method according to claim 1, further comprising:
    when the terminal constructs the BSR data units according to the information of buffer data volume to be transmitted, dividing the constructed BSR data units into different types according to content composition of the BSR data units.

4. The method according to claim 3, wherein when the terminal selects to send the BSR data units on a plurality of uplink component carriers, if there is a plurality of BSR data units to be sent, the plurality of data units are of the same BSR type or of different BSR types.

5. The method according to claim 4, wherein the step of dividing the constructed BSR data units into different types according to content composition of the BSR data units comprises: if all characteristics and composition methods of content composition of two BSR data units are completely identical, determining that the two BSR data units have the same content composition; if all characteristics and composition methods of content composition of two BSR data units are not completely identical, determining that the two BSR data units have different content composition.

6. The method according to claim 5, wherein when the terminal has buffer status information of a plurality of LCGs or LCHs, principles for the terminal to select content composition of the BSR units to send comprise:
    at the same moment, the terminal selects and sends buffer status information of as many as possible LCGs or LCHs to the eNB; or
    at the same moment, the terminal preferably sends buffer status information of an LCG including an LCH with a higher priority or buffer status information of an LCH with a higher priority; or
    at the same moment, if one or more BSR data units of the terminal have included buffer status information of all LCGs or all LCHs with buffer data to be transmitted, other BSR data units of the terminal only include buffer status information of part of the LCGs or part of the LCHs with buffer data to be transmitted.

7. The method according to claim 3, wherein when the terminal divides the BSR data units into different types according to the content composition of the BSR data units, the content composition of the BSR data units comprise the following forms:
    an object corresponding to buffer status information included in a BSR data unit is buffer status information of an LCG or an LCH;
    a BSR data unit only includes buffer status information of one LCG or one LCH of the terminal;
    a BSR data unit includes buffer status information of part of the LCGs or part of the LCHs of the terminal; or
    a BSR data unit includes buffer status information of all LCGs or all LCHs of the terminal.

8. The method according to claim 7, wherein
    when a BSR data unit only includes the buffer status information of one LCG or one LCH of the terminal, the BSR includes serial number information of the LCG or LCH and information of buffer data volume to be transmitted of the LCG or LCH, wherein a length of the information of the buffer data volume to be transmitted is greater than or equal to 6 bits.

9. The method according to claim 8, wherein the length of the information of the buffer data volume to be transmitted is:
    set fixedly in an evolved base station (eNB) and on the terminal side; or
    configured by the eNB and notified to the terminal by a broadcast channel or a special radio resource control (RRC) message; or
    selected by the terminal according to a total bandwidth of all configured uplink component carriers; the wider the total bandwidth is, the longer length of the information of the buffer data volume to be transmitted is selected.

10. The method according to claim 8, wherein the information of the buffer data volume to be transmitted of the LCG(s) or LCH(s) in the BSR represents level information of an actual buffer data volume(s) to be transmitted of the LCG(s) or LCH(s), and a corresponding relation between the level information and the actual buffer data volume to be transmitted of the LCG(s) or LCH(s) comprises: each level corresponds to a data volume range; data volume ranges corresponding to neighboring levels are continuous; a data volume range corresponding to each level is a fixed value, or an increasing value increasing with level, or a combination of a fixed value and an increasing value;
    the corresponding relation is formed by adding a new corresponding relation to a corresponding relation defined by a single carrier technology, or by changing the current corresponding relation defined by the single carrier technology, or by setting a bran-new corresponding relation.

11. The method according to claim 7, wherein when a BSR data unit includes the buffer status information of part of the LCGs or part of the LCHs of the terminal, the BSR data unit includes serial number information of the LCGs or LCHs, the serial number information indicates a bit bitmap of all LCGs or LCHs arranged according to the order of the serial numbers of the LCGs or LCHs, a length of the serial number information is N bits and N is a total number of the LCGs or LCHs, a certain bit in a bit bitmap of an LCG or LCH is 1 or 0 for indicating whether information of a buffer data volume to be transmitted of the LCG or LCH corresponding to the bit is included in the BSR data unit; the BSR data unit further includes information of a buffer data volume to be transmitted of a corresponding LCG or LCH in the bit bitmap, a length of the information of the buffer data volume to be transmitted is greater than or equal to 6 bits, and information of buffer data volumes to be transmitted of the LCGs or LCHs is arranged according to the sequence of the LCGs or LCHs in the bit bitmap.

12. The method according to claim 11, wherein the length of the information of the buffer data volume to be transmitted is:
    set fixedly in an evolved base station (eNB) and on the terminal side; or
    configured by the eNB and notified to the terminal by a broadcast channel or a special radio resource control (RRC) message; or
    selected by the terminal according to a total bandwidth of all configured uplink component carriers; the wider the total bandwidth is, the longer length of the information of the buffer data volume to be transmitted is selected.

13. The method according to claim 11, wherein the information of the buffer data volume to be transmitted of the LCG(s) or LCH(s) in the BSR represents level information of an actual buffer data volume(s) to be transmitted of the LCG(s) or LCH(s), and a corresponding relation between the level information and the actual buffer data volume to be transmitted of the LCG(s) or LCH(s) comprises: each level corresponds to a data volume range; data volume ranges corresponding to neighboring levels are continuous; a data volume range corresponding to each level is a fixed value, or an increasing value increasing with level, or a combination of a fixed value and an increasing value;
    the corresponding relation is formed by adding a new corresponding relation to a corresponding relation defined by a single carrier technology, or by changing the current corresponding relation defined by the single carrier technology, or by setting a bran-new corresponding relation.

14. The method according to claim 7, wherein when a BSR data unit includes the buffer status information of all LCGs or LCHs of the terminal, the BSR data unit includes information of buffer data volumes to be transmitted of all LCGs or all LCHs of the terminal, a length of information of a buffer data volume to be transmitted is greater than or equal to 6 bits, and the information of buffer data volume to be transmitted of the LCGs or LCHs is arranged according to the sequence of the serial numbers of the LCGs or LCHs.

15. The method according to claim 14, wherein the length of the information of the buffer data volume to be transmitted is:
    set fixedly in an evolved base station (eNB) and on the terminal side; or
    configured by the eNB and notified to the terminal by a broadcast channel or a special radio resource control (RRC) message; or
    selected by the terminal according to a total bandwidth of all configured uplink component carriers; the wider the total bandwidth is, the longer length of the information of the buffer data volume to be transmitted is selected.

16. The method according to claim 14, wherein the information of the buffer data volume to be transmitted of the LCG(s) or LCH(s) in the BSR represents level information of an actual buffer data volume(s) to be transmitted of the LCG(s) or LCH(s), and a corresponding relation between the level information and the actual buffer data volume to be transmitted of the LCG(s) or LCH(s) comprises: each level corresponds to a data volume range; data volume ranges corresponding to neighboring levels are continuous; a data volume range corresponding to each level is a fixed value, or an increasing value increasing with level, or a combination of a fixed value and an increasing value;
    the corresponding relation is formed by adding a new corresponding relation to a corresponding relation defined by a single carrier technology, or by changing the current corresponding relation defined by the single carrier technology, or by setting a bran-new corresponding relation.

17. The method according to claim 7, wherein
    BSR data units sent on radio resources of multiple uplink component carriers by the terminal are of BSR data unit types defined in a single carrier system or of new BSR data unit types supporting a carrier aggregation technology;
    the BSR data units supporting the carrier aggregation technology comprises: truncated BSR data units including buffer status information of part of the LCGs; short BSR data units including buffer status information of one LCG; or long BSR data units including buffer status information of all LCGs.

18. The method according to claim 3, wherein the step of dividing the constructed BSR data units into different types according to content composition of the BSR data units comprises: if all characteristics and composition methods of content composition of two BSR data units are completely identical, determining that the two BSR data units have the same content composition; if all characteristics and composition methods of content composition of two BSR data units are not completely identical, determining that the two BSR data units have different content composition.

19. The method according to claim 18, wherein when the terminal has buffer status information of a plurality of LCGs or LCHs, principles for the terminal to select content composition of the BSR units to send comprise:
    at the same moment, the terminal selects and sends buffer status information of as many as possible LCGs or LCHs to the eNB; or at the same moment, the terminal preferably sends buffer status information of an LCG including an LCH with a higher priority or buffer status information of an LCH with a higher priority; or at the same moment, if one or more BSR data units of the terminal have included buffer status information of all LCGs or all LCHs with buffer data to be transmitted, other BSR data units of the terminal only include buffer status information of part of the LCGs or part of the LCHs with buffer data to be transmitted.

20. The method according to claim 1, wherein the channel quality-related information comprises: modulation and coding scheme information, signal to interference noise ratio information, signal-to-noise ratio information, packet error rate information, block error rate information or bit error rate information.

21. The method according to claim 1, wherein
BSR data units sent on radio resources of multiple uplink component carriers by the terminal are of BSR data unit types defined in a single carrier system or of new BSR data unit types supporting a carrier aggregation technology;
the BSR data units supporting the carrier aggregation technology comprises: truncated BSR data units including buffer status information of part of the LCGs; short BSR data units including buffer status information of one LCG; or long BSR data units including buffer status information of all LCGs.

22. The method according to claim 1, wherein
at the same transmission moment, BSR data units sent by the terminal on radio resources of multiple uplink component carriers are of BSR data unit types defined in a single-carrier system, or of new BSR data unit types supporting a carrier aggregation technology;
the BSR data unit types supporting the carrier aggregation technology comprise: truncated BSR data units including buffer status information of part of the LCGs; short BSR data units including buffer status information of one LCG; or long BSR data units including buffer status information of all LCGs.

23. The method according to claim 1, further comprising:
adding identification information corresponding to a BSR type to an MAC sub-header by the terminal, acquiring by an eNB on the network side that the BSR and the type thereof are included in a Media Access Control Protocol Data Unit (MAC PDU) according to the identification information in the MAC sub-header after receiving the MAC PDU sent by the terminal; or
changing existing corresponding relation(s) of one or more pieces of identification information in the MAC sub-header by the terminal to correspond to a new BSR data unit type supporting a carrier aggregation technology, and determining whether the MAC sub-header in the MAC PDU sent by the terminal is the MAC sub-header with the changed corresponding relation(s) of identification information by the eNB according to terminal capability information after the terminal reports an RRC layer message including the terminal capability information to the eNB on the network side; or
changing existing corresponding relation(s) of one or more pieces of identification information in the MAC sub-header by the terminal to correspond to a new BSR data unit type supporting a carrier aggregation technology, and sending a specific RRC-dedicated message by the eNB to the terminal to notify whether to use the MAC sub-header with the changed corresponding relation(s) of identification information after a Radio Resource Control (RRC) layer link is established between the terminal and the eNB on the network side.

24. The method according to claim 1, further comprising:
when the terminal has triggered a regular buffer status report and the terminal has no Physical Uplink Shared Channel (PUSCH) resources for sending new data in a current Transmission Time Interval (TTI), the terminal triggers a Scheduling Request (SR);
when the terminal has triggered an SR and there is no available PUSCH resources on any uplink component carrier, the terminal sends the SR in a TTI when there are available Physical Uplink Channel (PUCCH) resources and requests the eNB to allocate PUSCH resources for the terminal.

25. A network system for reporting a buffer status report (BSR), comprising an evolved base station (eNB) and a terminal;
the terminal being arranged to:
acquire radio resource information of uplink component carriers of a radio network from a base station,
construct one or more BSR data units according to information of a buffer data volume to be transmitted,
select one or more uplink component carriers from the uplink component carriers with available radio resources, which comprises: when the terminal has available radio resources only on one uplink component carrier, the terminal only selecting the one uplink component carrier; and when the terminal has available radio resources on multiple uplink component carriers, the terminal selecting an uplink component carrier with channel quality-related information having a higher priority than channel quality-related threshold information, according to the channel quality-related information of the radio resource on the uplink component carrier issued by the eNB on the network side and/or the channel quality-related threshold information configured by the eNB, and
send the BSR data units on radio resources of the selected uplink component carrier(s) to the eNB; and
the eNB being arranged to allocate radio resources of component carriers for the terminal, receive the BSR data units reported by the terminal through the radio resources of the uplink component carriers, and analyze the BSR data units to acquire a buffer status of the terminal.

26. A terminal for reporting a buffer status report (BSR), comprising:
a component carrier radio resource acquisition module being arranged to acquire radio resources of uplink component carriers allocated to a terminal by a base station and notify a radio resource selection module of the radio resource information;
a buffer information monitoring module being arranged to monitor and acquiring information of a buffer data volume to be transmitted of the terminal and notify a buffer status report generating module of the information of the data volume to be transmitted;
a buffer status report generating module being arranged to construct one or more BSR data units according to the information of the buffer data volume to be transmitted;
a radio resource selection module being arranged to:
select one or more uplink component carriers for sending the one or more BSR data units from the radio resources acquired from the component carrier radio resource acquisition module, which comprises: when the terminal has available radio resources only on one uplink component carrier, only selecting the one uplink component carrier; and when the terminal has available radio resources on multiple uplink component carriers, selecting an uplink component carrier with channel quality-related information having a higher priority than channel quality-related threshold information, according to the channel quality-related information of the radio resource on the uplink component carrier issued by an evolved base station (eNB) on the network side and/or the channel quality-related threshold information configured by the eNB, and send the selection result to a BSR sending module; and a BSR sending module being arranged to send the one or more BSR data units generated by the buffer status report generating module on the radio resources selected by the radio resource selection module to an evolved base station (eNB) on the network side.

27. The terminal according to claim 26, wherein the buffer status report generating module is further arranged to construct different BSR types according to the information of the buffer data volume to be transmitted, that is, divide BSR data units into different types according to content composition of the BSR data units;

the content composition of the BSR data units comprises the following forms:

the BSR data units only include buffer status information of one LCG or one LCH of the terminal;

the BSR data units include buffer status information of part of the LCGs or part of the LCHs of the terminal; or the BSR data units include buffer status information of all LCGs or all LCHs of the terminal.

* * * * *